(12) United States Patent
Rohrich

(10) Patent No.: US 7,410,139 B1
(45) Date of Patent: Aug. 12, 2008

(54) ALL-PURPOSE HANGER

(75) Inventor: Richard Rohrich, Forsyth, MT (US)

(73) Assignee: Spanwell Service, Inc., Forsyth, MT (US)

( * ) Notice: Subject to any disclaimer, the term of this patent is extended or adjusted under 35 U.S.C. 154(b) by 0 days.

(21) Appl. No.: 11/757,359

(22) Filed: Jun. 2, 2007

(51) Int. Cl.
*A47H 1/16* (2006.01)

(52) U.S. Cl. ..................... 248/302; 248/339

(58) Field of Classification Search ........... 248/302, 248/303, 304, 339, 58, 214, 72, 322, 340
See application file for complete search history.

(56) References Cited

U.S. PATENT DOCUMENTS

| | | | | |
|---|---|---|---|---|
| 3,353,570 | A | * | 11/1967 | Sweat ................ 139/88 |
| 4,023,762 | A | * | 5/1977 | Batts et al. ............ 248/340 |
| 4,042,200 | A | * | 8/1977 | Overall ............ 248/221.12 |
| 4,616,797 | A | | 10/1986 | Cramer |
| 4,666,116 | A | * | 5/1987 | Lloyd ................ 248/228.6 |
| 4,702,448 | A | | 10/1987 | LoJacono et al. |
| 5,188,332 | A | * | 2/1993 | Callas .................. 248/544 |
| 5,924,667 | A | * | 7/1999 | Grahn et al. .......... 248/304 |
| D504,304 | S | | 4/2005 | Hancock |
| D522,348 | S | | 6/2006 | Hansen |
| 7,175,143 | B1 | | 2/2007 | Ho |

* cited by examiner

*Primary Examiner*—Ramon O Ramirez
(74) *Attorney, Agent, or Firm*—Antoinette M. Tease

(57) ABSTRACT

All-purpose hanger comprising a hanging block and two S hooks; the hanging block comprises a front surface, two side surfaces, a rear surface, a top surface, a bottom surface, and a clamping port; the clamping port is at a forty-five-degree angle relative to the front and rear surfaces; the hanging block further comprises a plurality of S hook insertion holes and a threaded bolt that extends through the top surface and into the clamping port; one S hook insertion hole is located on the front surface and is at a forty-five-degree angle relative to the front surface; another S hook insertion hole is located on the rear surface and is at a forty-five-degree angle relative to the rear surface; two S hook insertion holes are located on each of the side surfaces; and the S hook insertion holes located on the front and rear surfaces exit from the bottom surface.

14 Claims, 29 Drawing Sheets

ALL-PURPOSE HANGER

BACKGROUND OF THE INVENTION

1. Field of the Invention

The present invention relates generally to the field of hangers, and more specifically, to a hanger that is designed to provide superior versatility.

2. Description of the Related Art

There exists a need for a hanging device that can be clamped onto any flat, angled, or round surface and that provides a secure mechanism for hanging cables, cords, hoses, pipes, etc. The present invention optimizes work space by allowing workers to remove and place their equipment overhead or out of the way instead of lying it on the ground. Having cables, cords and the like lying on the ground or in positions where they are not secured and out of the way can lead to safety incidents such as slips, trips and falls.

These concerns are particularly acute in work situations involving scaffolding or other jobs that are performed several stories above the ground, where tripping and falling can have fatal consequences. Currently, workers in those situations sometimes resort to welding a bracket, hook or rod on the support structure (scaffolding) itself, which is not recommended. The present invention would give these workers a mechanism for hanging their cords and cables that requires no welding and is removable, repositionable and reusable.

Slip, trip and fall accidents are among the most common types of accidents resulting in workers' compensation injuries and general liability lawsuits. One of the key precautionary measures employers can take is to ensure that cables, cords and the like are secured out of the way of workers and pedestrians. The present invention allows employers to further the safety of their workers by giving them a means to secure cables, cords and similar items so that they do not interfere with work spaces or travel areas.

The present invention can also be used for general purpose organizing and storage in garages, storage areas, utility vehicles, etc. In fact, the present invention is so versatile that it can be utilized to hang not only cables, cords, hoses and pipes but also bicycles, sporting gear, clothing, and anything else that can be hung with an S hook. The present invention is designed to clamp onto almost any surface and to allow articles to be hung at literally any angle.

A number of hanging devices and/or brackets have been patented, but none of these devices incorporates the versatility of the present invention. These prior art devices include those described in U.S. Pat. No. 4,702,448 (LoJacono et al., 1987); U.S. Pat. No. 7,175,143 (Ho, 2007); U.S. Pat. No. D504,304 (Hancock, 2005); U.S. Pat. No. D522,348 (Hansen, 2006); U.S. Pat. No. 4,616,797 (Cramer, 1986); and U.S. Pat. No. 4,666,116 (Lloyd, 1987).

BRIEF SUMMARY OF THE INVENTION

The present invention is an all-purpose hanger comprising: a hanging block; and two S hooks; wherein the hanging block comprises a front surface, two side surfaces, a rear surface, a top surface, a bottom surface, and a clamping port; wherein the clamping port is at a forty-five-degree angle relative to the front and rear surfaces of the hanging block; wherein the hanging block further comprises a threaded bolt that extends through the top surface of the hanging block and down into the clamping port; wherein the hanging block further comprises a plurality of S hook insertion holes; wherein one S hook insertion hole is located on the front surface of the hanging block and is at a forty-five-degree angle relative to the front surface; wherein one S hook insertion hole is located on the rear surface of the hanging block and is at a forty-five-degree angle relative to the rear surface; wherein two S hook insertion holes are located on each of the side surfaces of the hanging block; and wherein the S hook insertion holes located on the front and rear surfaces of the hanging block exit from the bottom surface of the hanging block.

In a preferred embodiment, the two S hook insertion holes on either side surface of the hanging block are situated side-by-side with one of the S hook insertion holes closer to the front surface of the hanging block and the other S hook insertion hole closer to the rear surface of the hanging block.

In a preferred embodiment, the top surface of the hanging block comprises a first face, a second face, and a third face; wherein the first face is at a forty-five-degree angle relative to the front surface; wherein the second face is parallel to the bottom surface of the hanging block; and wherein the third face is at a forty-five-degree angle relative to the rear surface of the hanging block. Preferably, the threaded bolt has an angle, and the angle of the S hook insertion hole on the front surface of the hanging block is parallel to the angle of the threaded bolt and the angle of the third face of the top surface.

In a preferred embodiment, the clamping port comprises a wall, the wall has an angle, and the angle of the wall is parallel to the angle of the threaded bolt. Preferably, the clamping port has an angle, and the S hook insertion hole on the rear surface of the hanging block is parallel to the angle of the clamping port and of the first face of the top surface of the hanging block. Preferably the threaded bolt and clamping port each has an angle, and the angle of the threaded bolt is perpendicular to the angle of the clamping port.

In a preferred embodiment, the clamping port comprises a ceiling and a floor, and the floor of the clamping port comprises a V-shaped channel that runs from one side surface of the hanging block to the other side surface of the hanging block.

In a preferred embodiment, each S hook comprises a straight end and a curved end. In one embodiment, each S hook comprises a first end and a second end, and each S hook comprises a tie hole located on either the first or second end of the S hook. In another embodiment each S hook comprises a first end and a second end, and each end of the S hook comprises a tie hole.

In a preferred embodiment, each S hook insertion hole comprises a chamfer to allow for easier insertion of the S hooks and to facilitate movement of the S hooks in the S hook insertion holes.

In a preferred embodiment, when an S hook is inserted into the S hook insertion holes of the hanging block, the S hook maintains a vertical position relative to the ground regardless of the position of the hanging block. Preferably, when an S hook is inserted into the S hook insertion holes of the banging block and the hanging block is rotated by ninety degrees, the angle of the S hook relative to the ground does not change.

REFERENCE NUMBERS

Figure 1:
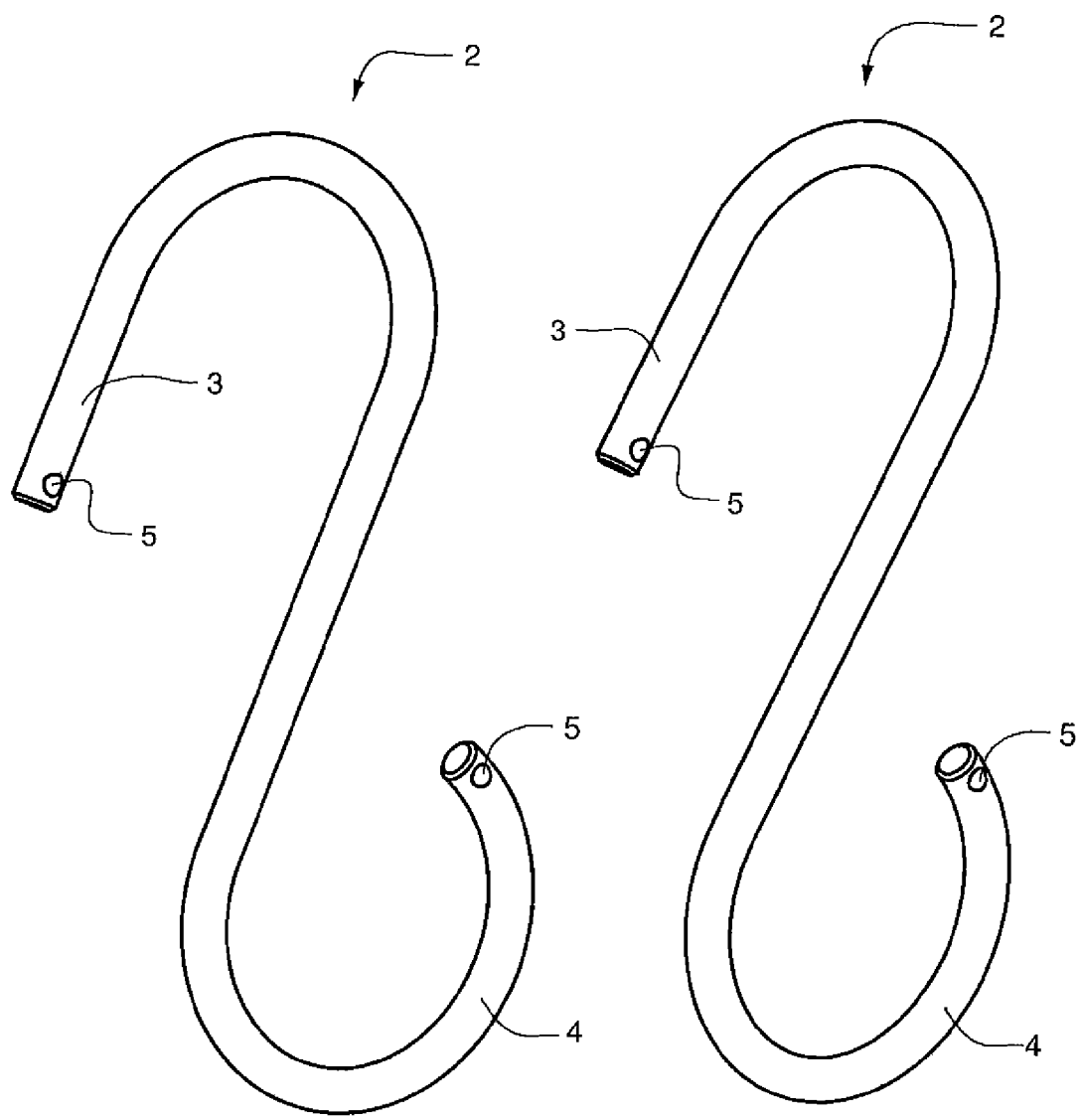
FIG. 1 is a perspective view of the two S hooks of the present invention.

1 Hanging block
2 S hook
3 Straight end (of S hook)
4 Curved end (of S hook)
5 Tie hole
6 Front surface (of hanging block)
7 Side surface (of hanging block)
8 Rear surface (of hanging block)
9 Top surface (of hanging block)
10 Bottom surface (of hanging block)
11 Clamping port
12 V-shaped channel (in clamping port)
13 Threaded bolt
14 First face (of top surface of hanging block)
15 Second face (of top surface of hanging block)
16 Third face (of top surface of hanging block)
17 Front S hook insertion hole
18 First side S hook insertion hole
19 Second side S hook insertion hole
20 Rear S hook insertion hole
21 Bottom S hook insertion hole
22 Chamfer/beveled edge (of S hook insertion hole)
23 Ceiling (of clamping port)
24 Wall (of clamping port)
25 Floor (of clamping port)
26 Frame
27 Rod

DETAILED DESCRIPTION OF INVENTION

The present invention comprises a hanging block 1 and two S hooks 2. FIG. 1 is a perspective view of the two S hooks of the present invention. As shown in this figure, each S hook preferably comprises a straight end 3 and curved end 4. The S hook is preferably designed this way to provide two different options for hanging-a wider hook and a narrower hook. One or the other may be used, depending on the size and type of item being hung. Both ends of each S hook preferably comprise a tie hole 5 for attaching string ties if desired.

Figure 2:
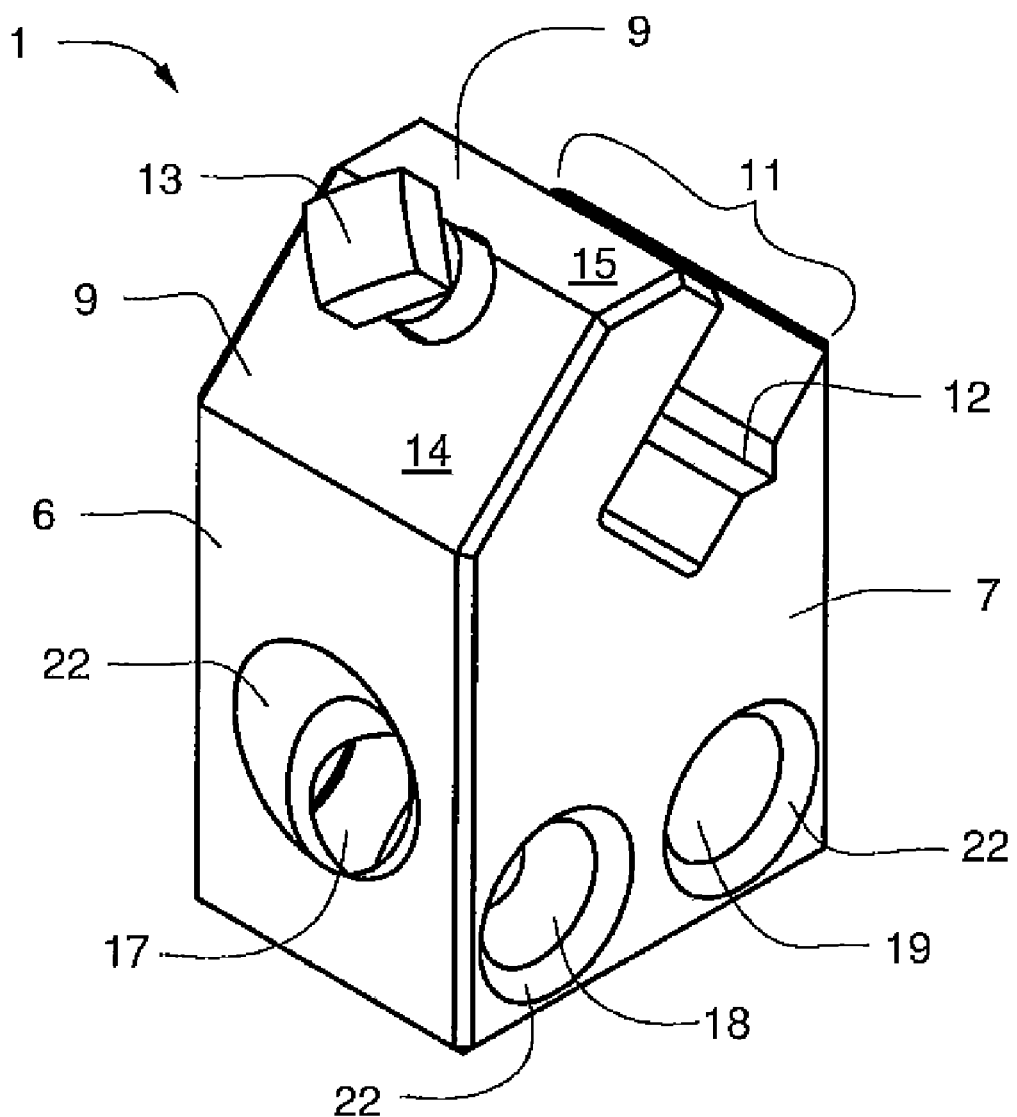
FIG. 2 is a front perspective view of the hanging block of the present invention.
Figure 20:
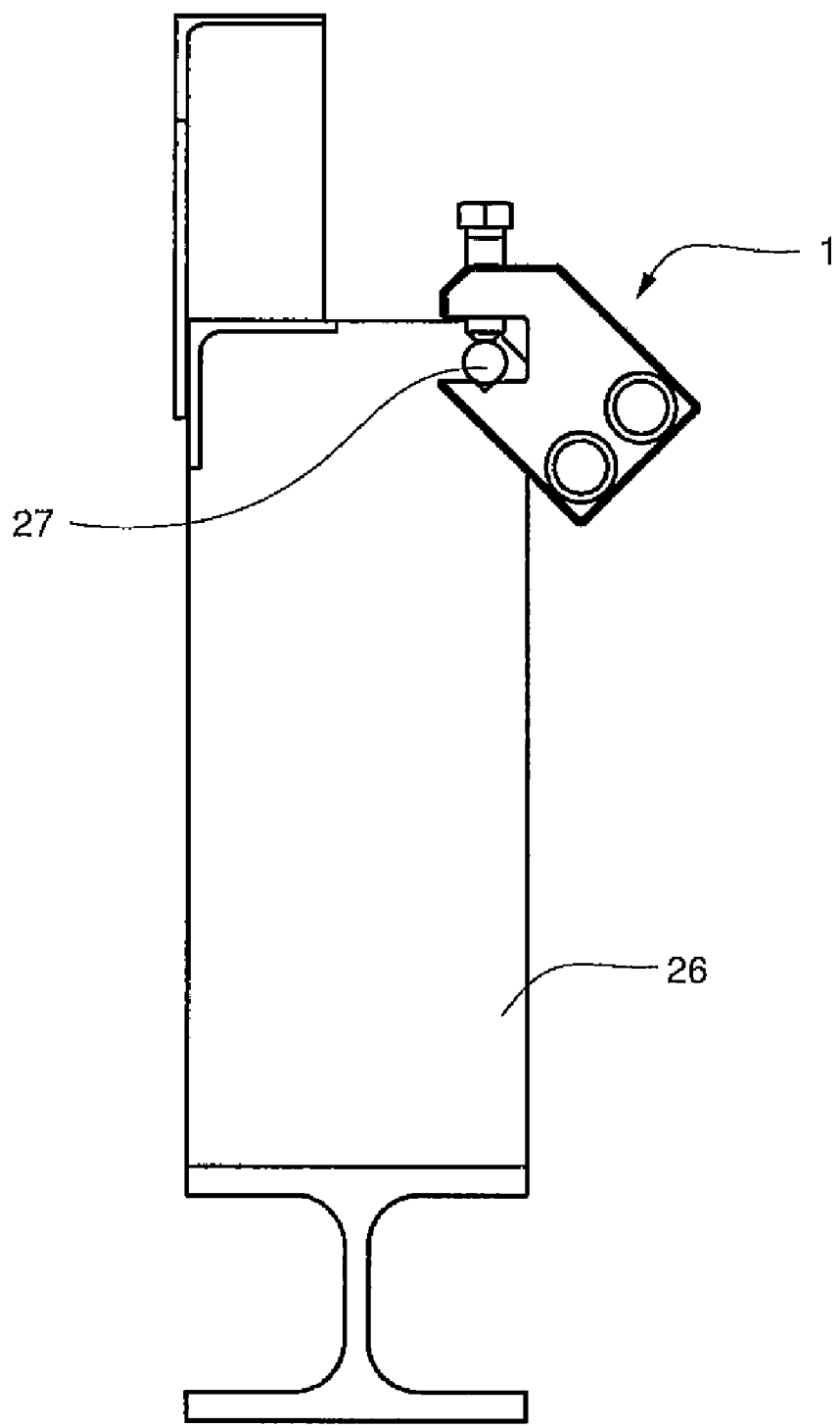
FIG. 20 is a side view of the hanging block clamped onto a rod in a tenth configuration.

FIG. 2 is a front perspective view of the hanging block of the present invention. As shown in this figure, the hanging block 1 comprises a front surface 6, two side surfaces 7, a rear surface 8 (not shown), a top surface 9, and a bottom surface 10 (not shown). The hanging block 1 further comprises a clamping port 11 that is at a forty-five-degree (45°) angle relative to the front and rear surfaces 7, 8 of the hanging block 1. (This is shown better in FIG. 4.) The clamping port 11 preferably comprises a V-shaped channel 12, the purpose of which is illustrated in FIG. 20.

The hanging block 1 further comprises a threaded bolt 13, which extends through the top surface 9 of the hanging block 1 and down into the clamping port 11. As shown in FIGS. 13-17 and 19-25, when the hanging block 1 is situated on a frame or rod such that a portion of the frame or rod is situated inside of the clamping port 11 and the threaded bolt 13 tightened on the frame or rod (or other surface), the hanging block 1 is thereby secured in place. The hanging block 1 can be removed, repositioned and reused by loosening the threaded bolt 13.

As shown in this and subsequent figures, the top surface 9 of the hanging block 1 preferably comprises three faces 14, 15, 16. The first face 14 is at a forty-five-degree (45°) angle relative to the front surface 6. The threaded bolt extends through this face of the top surface 6. The second face 15 is parallel to the bottom surface 10. The third face 16 (not shown) is at a forty-five-degree (45°) angle relative to the rear surface 8. The third face 16 is at the same angle as the entrance to the clamping port 11.

The hanging block 1 further comprises a plurality of S hook insertion holes. In a preferred embodiment, there are seven S hook insertion holes—one hole on the front surface 6, one hole on the rear surface 8, two holes on each of the side surfaces 7, and one hole in the bottom surface 10. The S hook insertion hole 17 on the front surface 6 is at a forty-five-degree (45°) angle relative to the front surface 6. The angle of this front S hook insertion hole 17 is parallel to the angle of the threaded bolt 13 and the third face 16 (not shown) of the top surface 9. It is also parallel to the wall 24 (see FIG. 3) of the clamping port 11. The front S hook insertion hole 17 exits from the bottom surface 10 (not shown) of the hanging block 1.

Two side S hook insertion holes are located on each of the two side surfaces 7 of the hanging block 1. These holes extend clear through to the other side surface 7 of the hanging block 1 and are preferably located side-by-side. A first side S hook insertion hole 18 is located closer to the front surface 6 of the hanging block 1, and a second side S hook insertion hole 19 is located closer to the rear surface 8 (not shown) of the hanging block 1.

All of the S hook insertion holes 17, 18, 19, 20 (see FIG. 3) and 21 (see FIG. 8) preferably comprise chamfers or beveled edges 22 that allow for easier insertion of the S hooks and facilitate movement of the S hooks in the S hook insertion holes.

Figure 3:
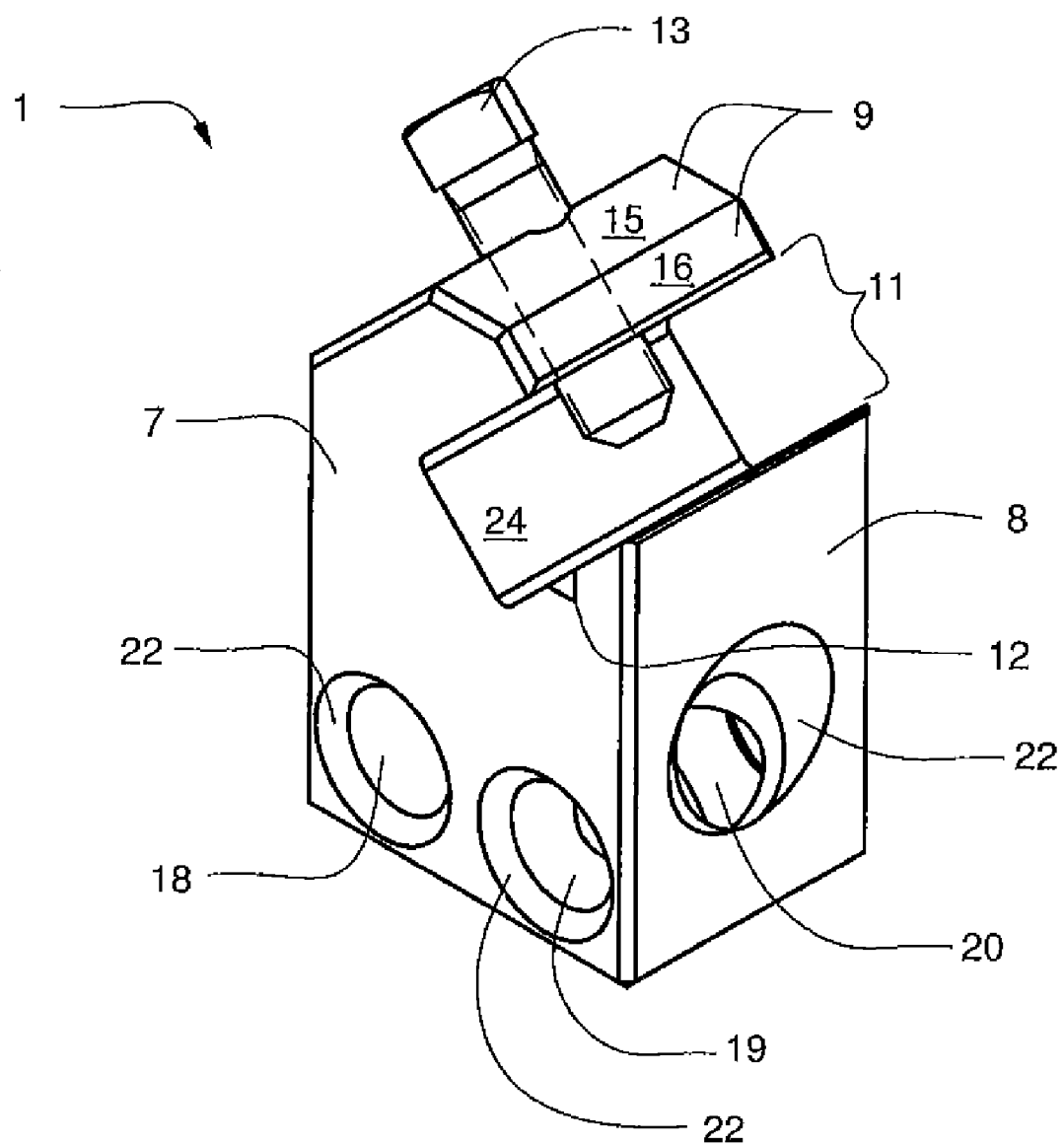
FIG. 3 is a rear perspective view of the hanging block of the present invention.

FIG. 3 is a rear perspective view of the hanging block of the present invention. This figure shows the rear surface 8 of the hanging block 1 and the rear S hook insertion hole 20. It also shows the third face 16 of the top surface 9 of the hanging block 1.

The rear S hook insertion hole 20 is at a forty-five-degree (45°) angle relative to the rear surface 8 of the hanging block 1, and it is parallel to the angle of the clamping port 11. It is also parallel to the first face 14 (not shown) of the top surface 9 of the hanging block 1.

Figure 4:
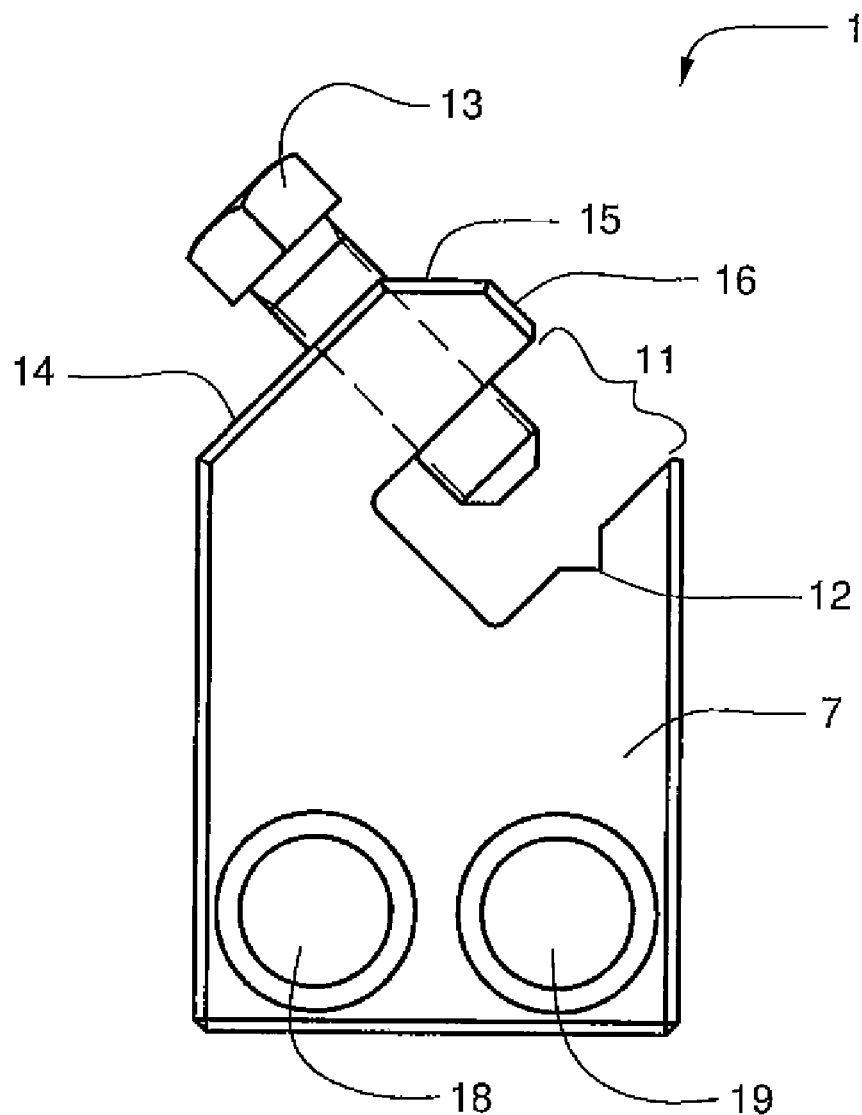
FIG. 4 is a side view of the hanging block of the present invention.

FIG. 4 is a side view of the hanging block of the present invention. As shown in this figure, the angle of the threaded bolt 13 is perpendicular to the angle of the clamping port 11. This ensures that when a frame or other surface to which the hanging block is to be secured is inserted into the clamping port 11, the threaded bolt 13 will be perpendicular to that surface, thereby enabling the threaded bolt 13 to clamp down on the surface and secure the hanging block 1 in position.

Figure 5:
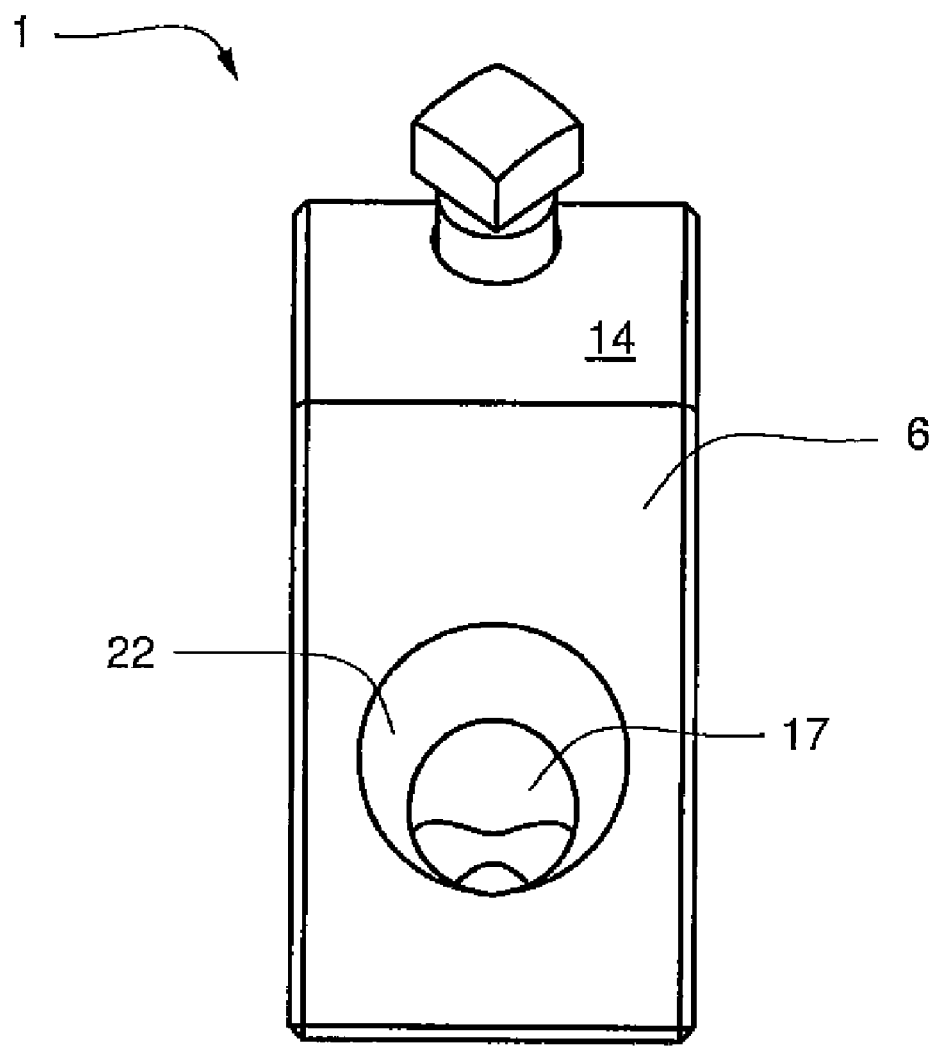
FIG. 5 is a front view of the hanging block of the present invention.

FIG. 5 is a front view of the hanging block of the present invention. This figure shows the front surface 6 of the hanging block 1, the first face 14 of the top surface 9 of the hanging block 1, and the front S hook insertion hole 17.

Figure 6:
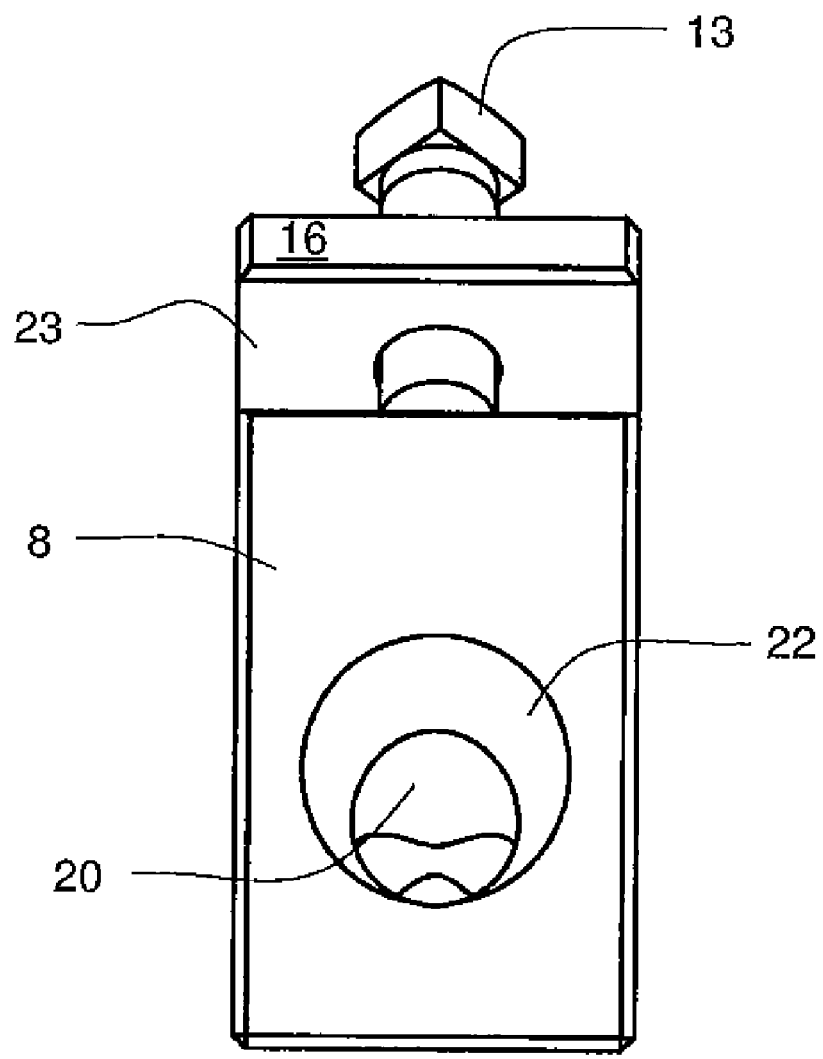
FIG. 6 is a rear view of the hanging block of the present invention.

FIG. 6 is a rear view of the hanging block of the present invention. This figure shows the rear surface 8 of the hanging block 1, the third face 16 of the top surface 9 of the hanging block 1, and the rear S hook insertion hole 20. It also shows the ceiling 23 of the clamping port 11.

Figure 7:
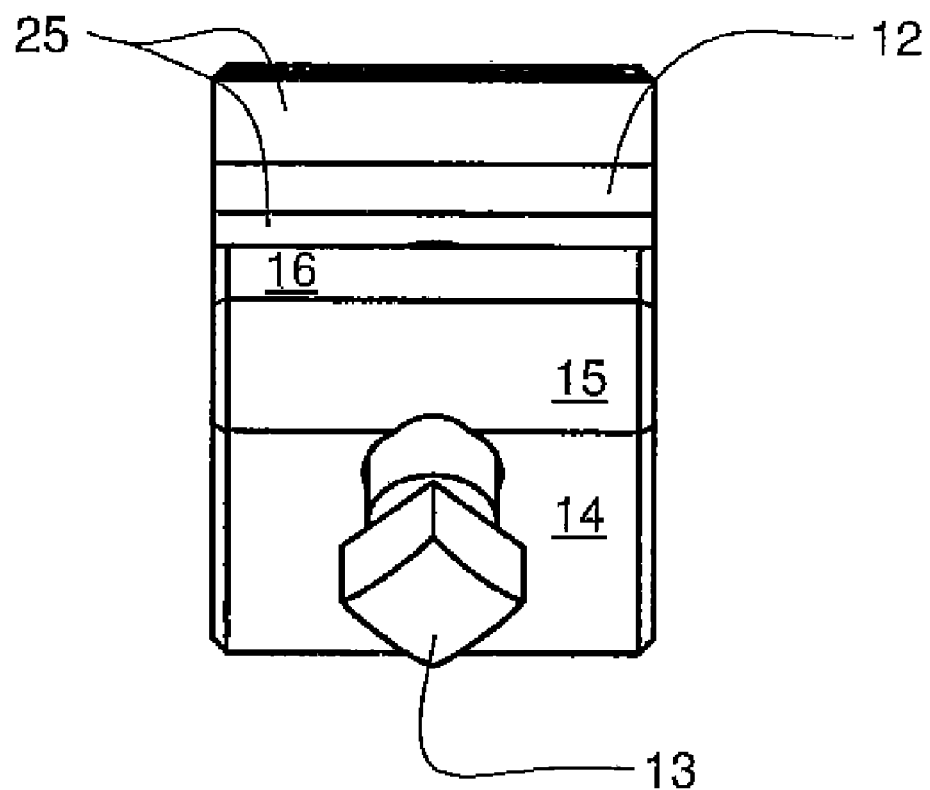
FIG. 7 is a top view of the hanging block of the present invention.

FIG. 7 is a top view of the hanging block of the present invention. This figure shows the first 14, second 15 and third 16 faces of the top surface 9 of the hanging block 1. It also shows the floor 25 of the clamping port 11 and the V-shaped channel 12 in the floor 25 of the clamping port 11.

Figure 8:
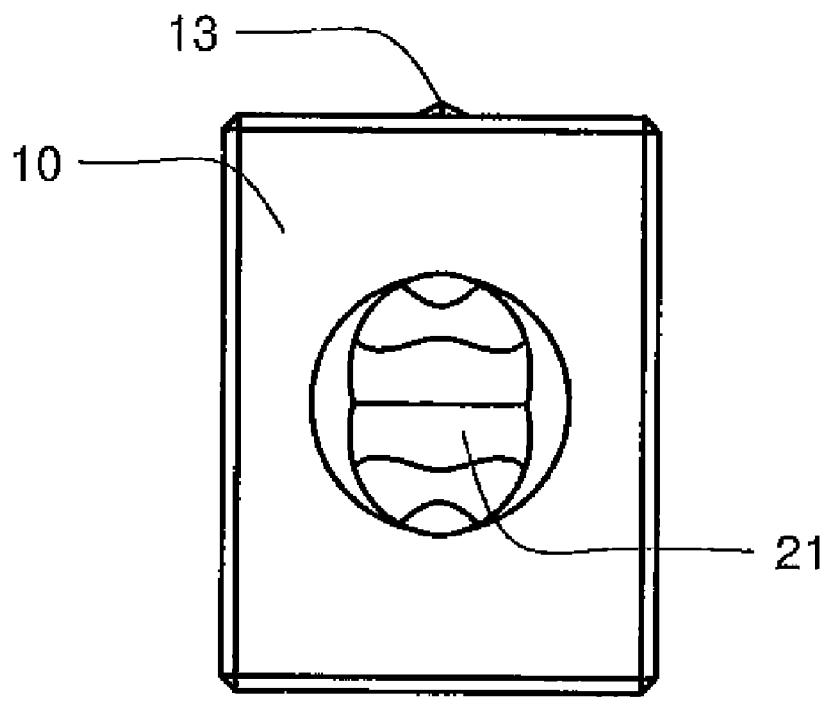
FIG. 8 is a bottom view of the hanging block of the present invention.

FIG. 8 is a bottom view of the hanging block of the present invention. This figure shows the bottom surface 10 of the hanging block 1 and the bottom S hook insertion hole 21. Both the front S hook insertion hole 17 and the rear S hook insertion hole 20 exit from the bottom S hook insertion hole 21.

FIGS. 9-12 show the hanging block 1 with a single S hook 2 in various configurations. These figures are not meant to be limiting but are intended to provide but a few examples of the possible configurations that can be utilized in connection with the present invention.

Figure 9:
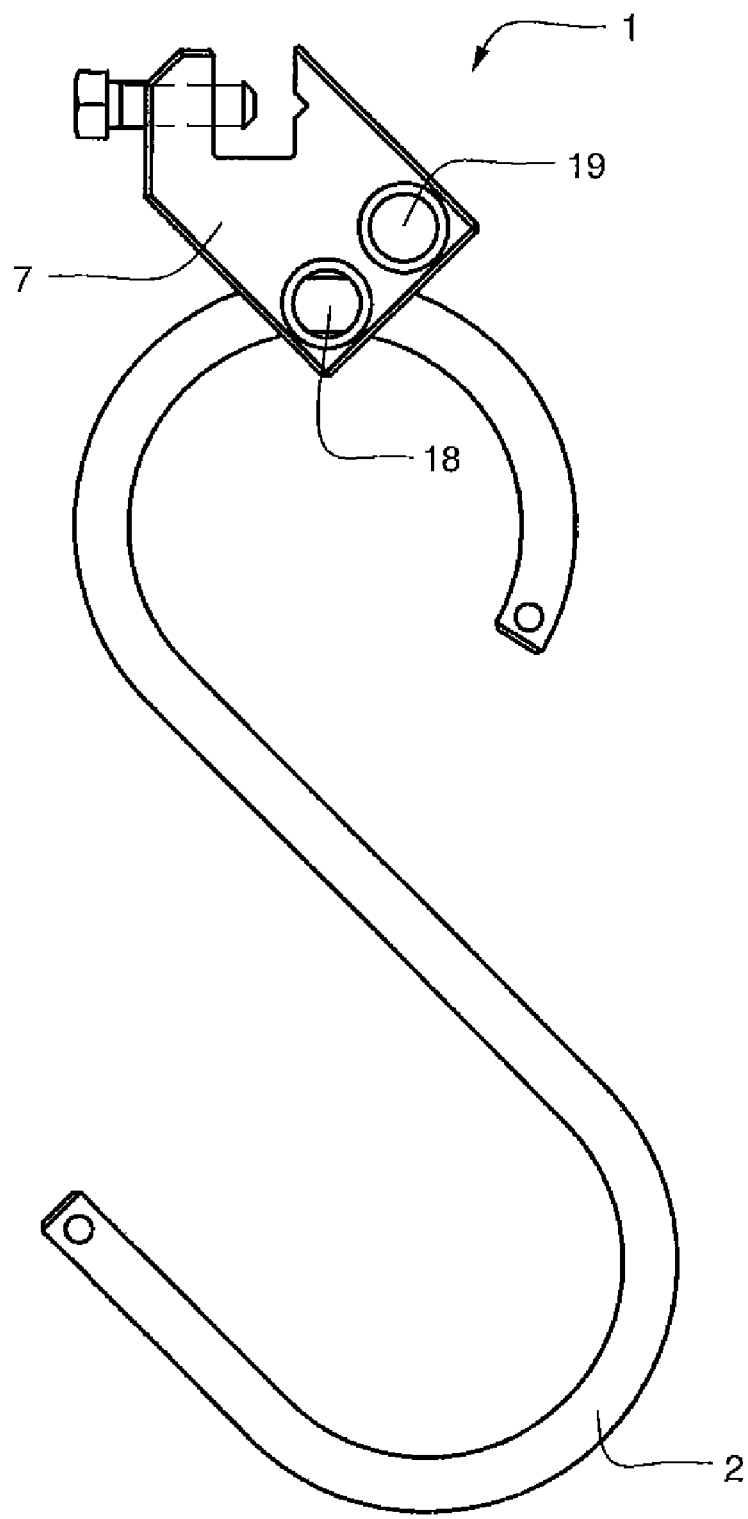
FIG. 9 is a side view of the hanging block with one of the S hooks inserted into the block in a first configuration.

FIG. 9 is a side view of the hanging block with one of the S hooks inserted into the block in a first configuration. In this figure, the S hook 2 has been inserted into the front S hook insertion hole 17 (not shown) and exits the hanging block 1 from the bottom S hook insertion hole 21 (not shown).

Figure 10:
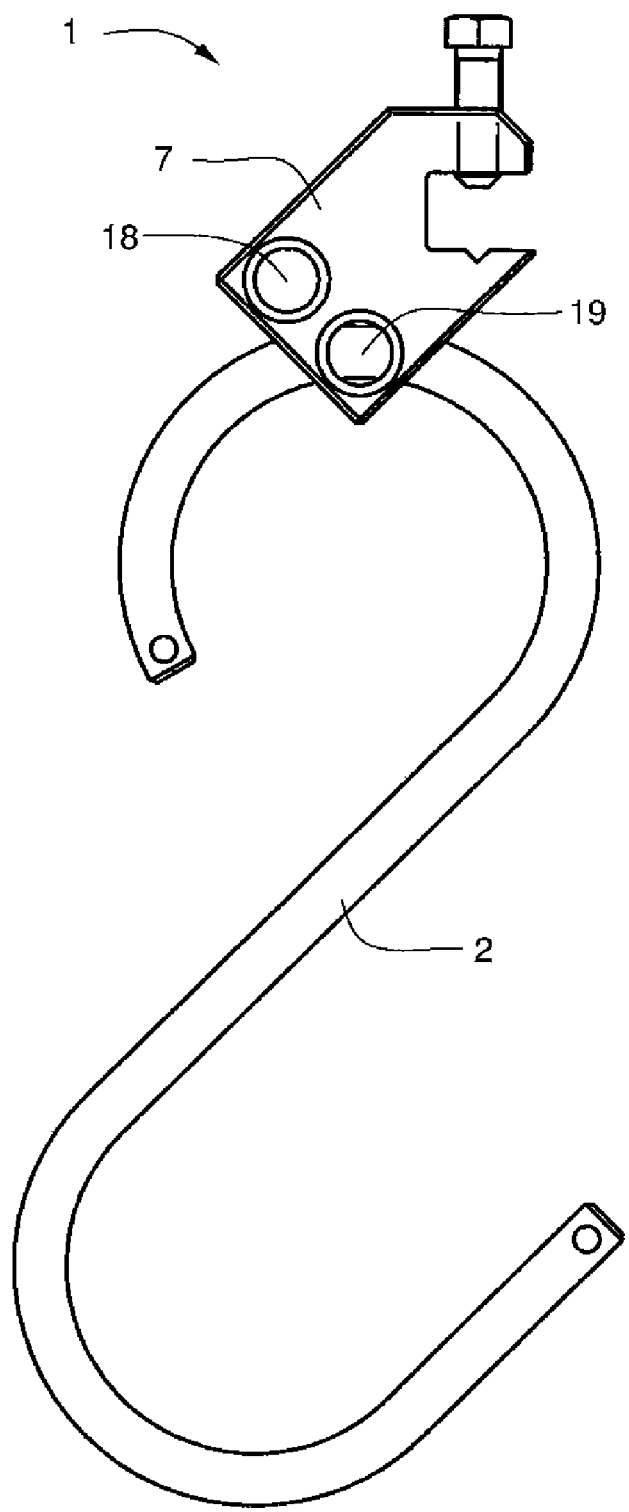
FIG. 10 is a side view of the hanging block with one of the S hooks inserted into the block in a second configuration.

FIG. 10 is a side view of the hanging block with one of the S hooks inserted into the block in a second configuration. In this figure, the S hook 2 has been inserted into the rear S hook insertion hole 20 (not shown) and exits the hanging block 1 from the bottom S hook insertion hole 21 (not shown).

Figure 11:
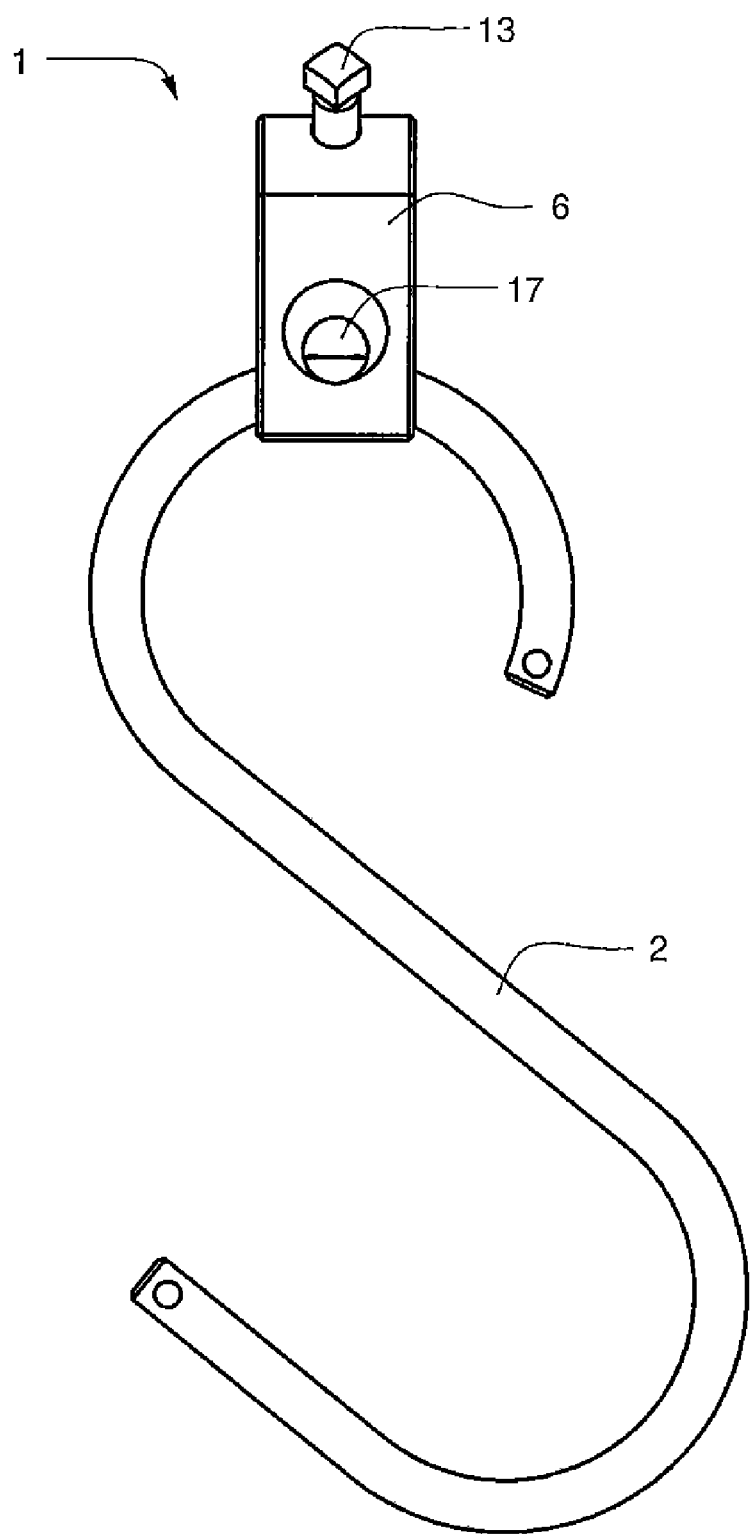
FIG. 11 is a front view of the hanging block with one of the S hooks inserted into the block in a third configuration.

FIG. 11 is a front view of the hanging block with one of the S hooks inserted into the block in a third configuration. In this figure, the S hook 2 has been inserted into the first side S hook insertion hole 18 on one side of the hanging block 1 and exits the hanging block 1 through the first side S hook insertion hole 18 on the other side of the hanging block 1.

Figure 12:
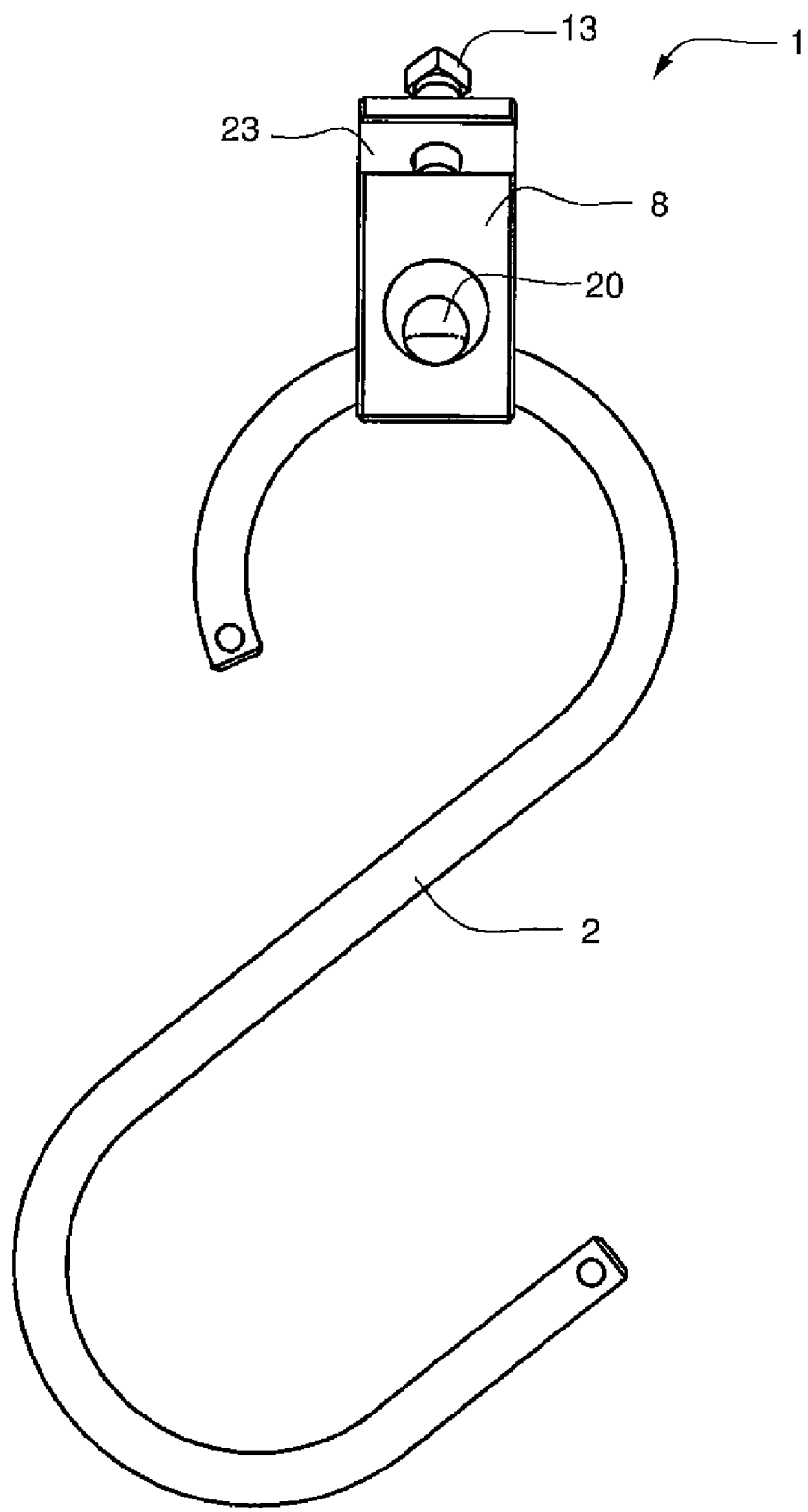
FIG. 12 is a rear view of the hanging block with one of the S hooks inserted into the block in a fourth configuration.

FIG. 12 is a rear view of the hanging block with one of the S hooks inserted into the block in a fourth configuration. In this figure, the S hook 2 has been inserted into the second side S hook insertion hole 19 on one side of the hanging block 1 and exits the hanging block 1 through the second side S hook insertion hole 19 on the other side of the hanging block 1. This figure also shows the ceiling 23 of the clamping port 11.

FIGS. 13-17 and 19-15 show the hanging block 1 and one or two S hooks 2 on a frame 26 that was built for the purpose of illustrating the versatility of the present invention. The frame 26 is not part of the present invention.

Figure 13:
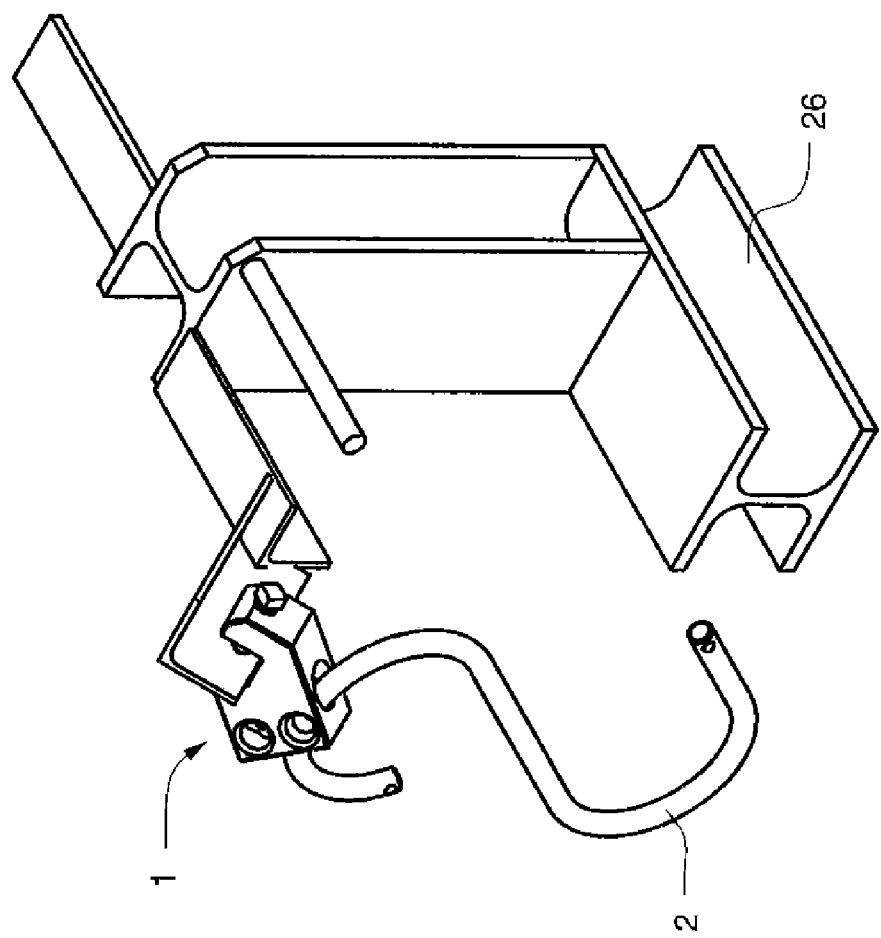
FIG. 13 is a perspective view of the hanging block on a frame with an S hook inserted into the block in a fifth configuration.

FIG. 13 is a perspective view of the hanging block on a frame with an S hook inserted into the block in a fifth configuration. In this figure, the S hook 2 is inserted through the front S hook insertion hole 17 and out the bottom S hook insertion hole 21, as shown in FIG. 9. Note that the S hook maintains a vertical orientation relative to the ground regardless of the position of the hanging block 1.

Figure 14:
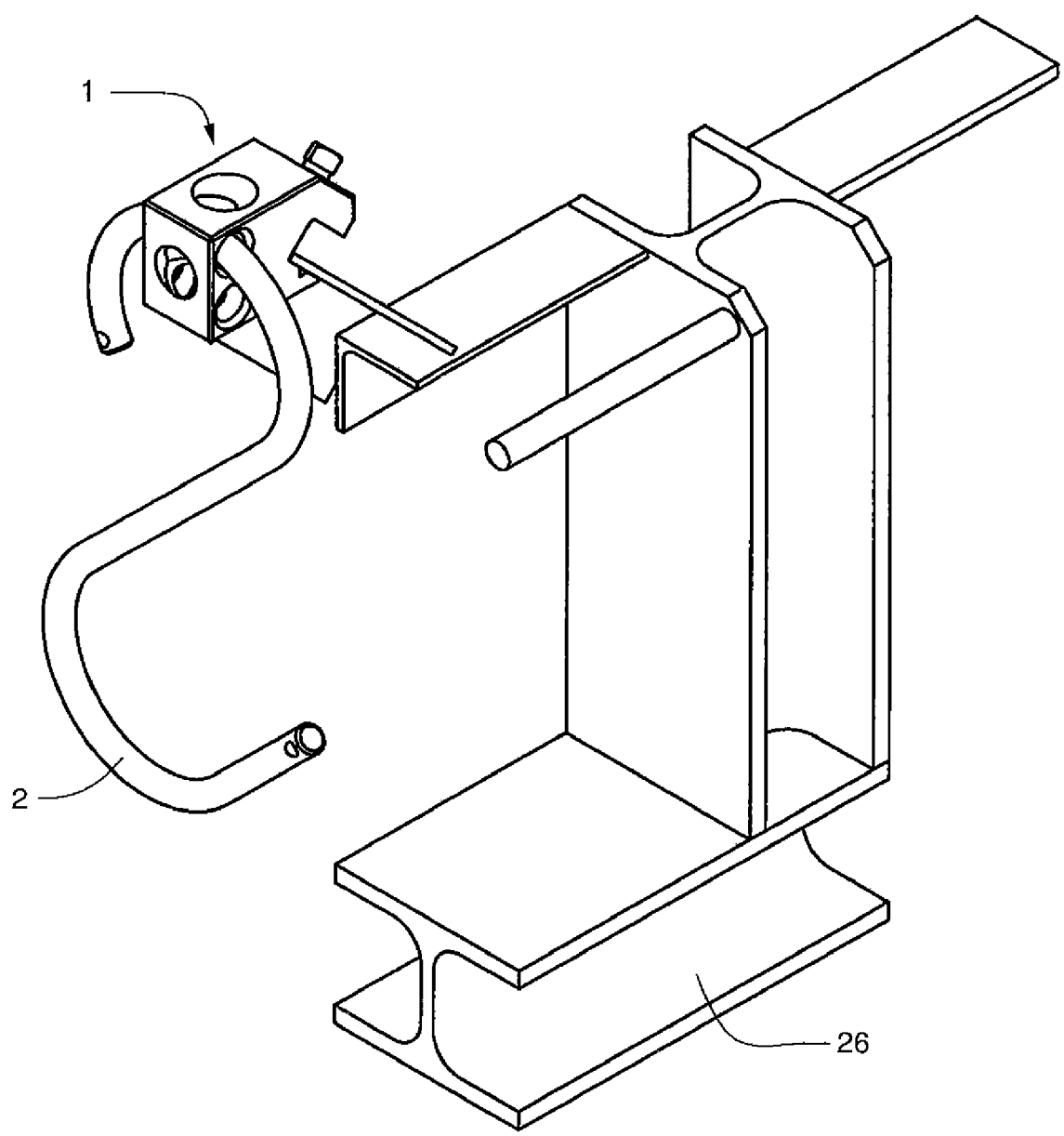
FIG. 14 is a perspective view of the hanging block on a frame with an S hook inserted into the block in a sixth configuration.

FIG. 14 is a perspective view of the hanging block on a frame with an S hook inserted into the block in a sixth configuration. In this figure, the S hook 2 is inserted through the first side S hook insertion hole 18 on one side of the hanging block 1 and exits through the first side hook insertion hole 18 on the other side of the hanging block 1, as shown in FIG. 1. Note again that the S hook maintains a vertical orientation relative to the ground regardless of the position of the hanging block 1.

Figure 15:
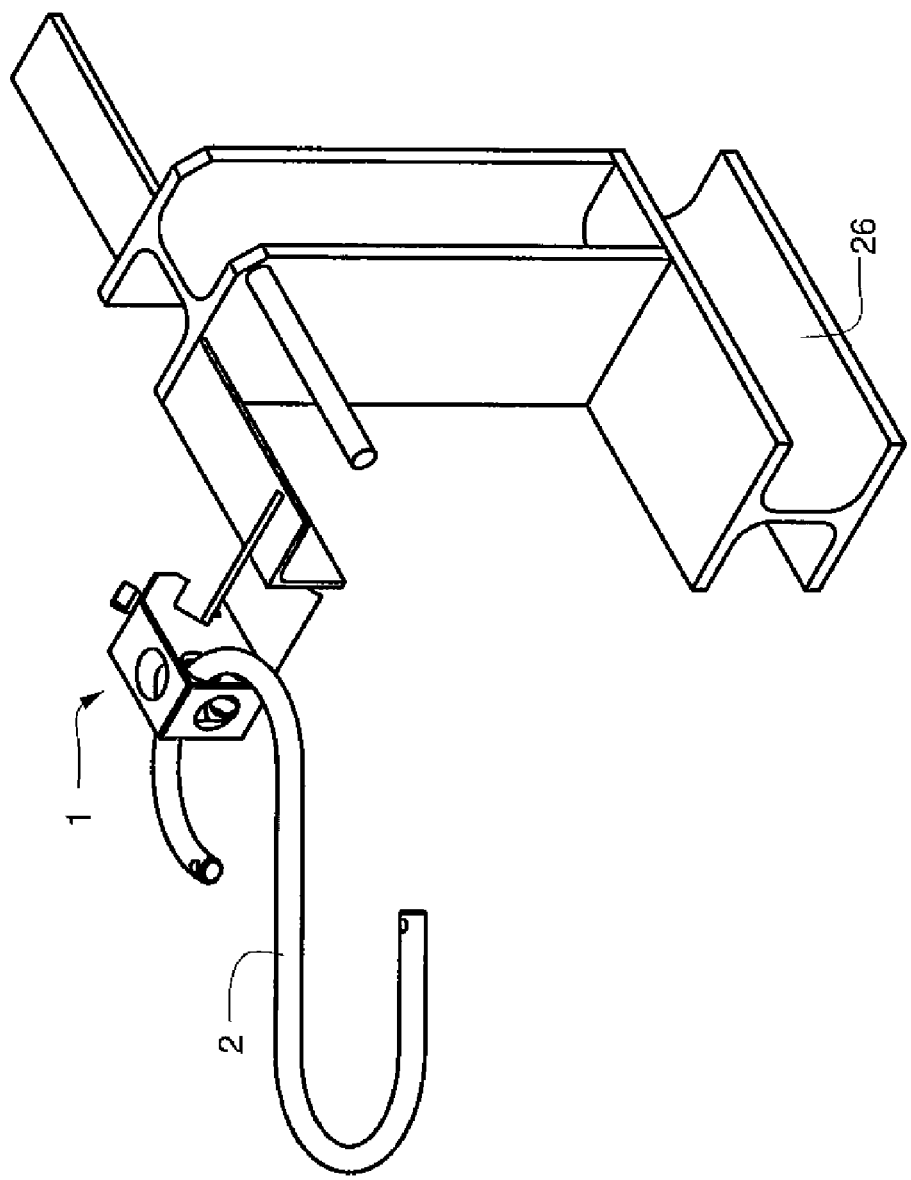
FIG. 15 is a perspective view of the same configuration shown in FIG. 14 but with the S hook extended horizontally.

FIG. 15 is a perspective view of the same configuration shown in FIG. 14 but with the S hook extended horizontally. The purpose of this figure is to show that the S hooks may be extended horizontally or even vertically upwards (not shown) to provide the particular configuration needed for a specific situation.

Figure 16:
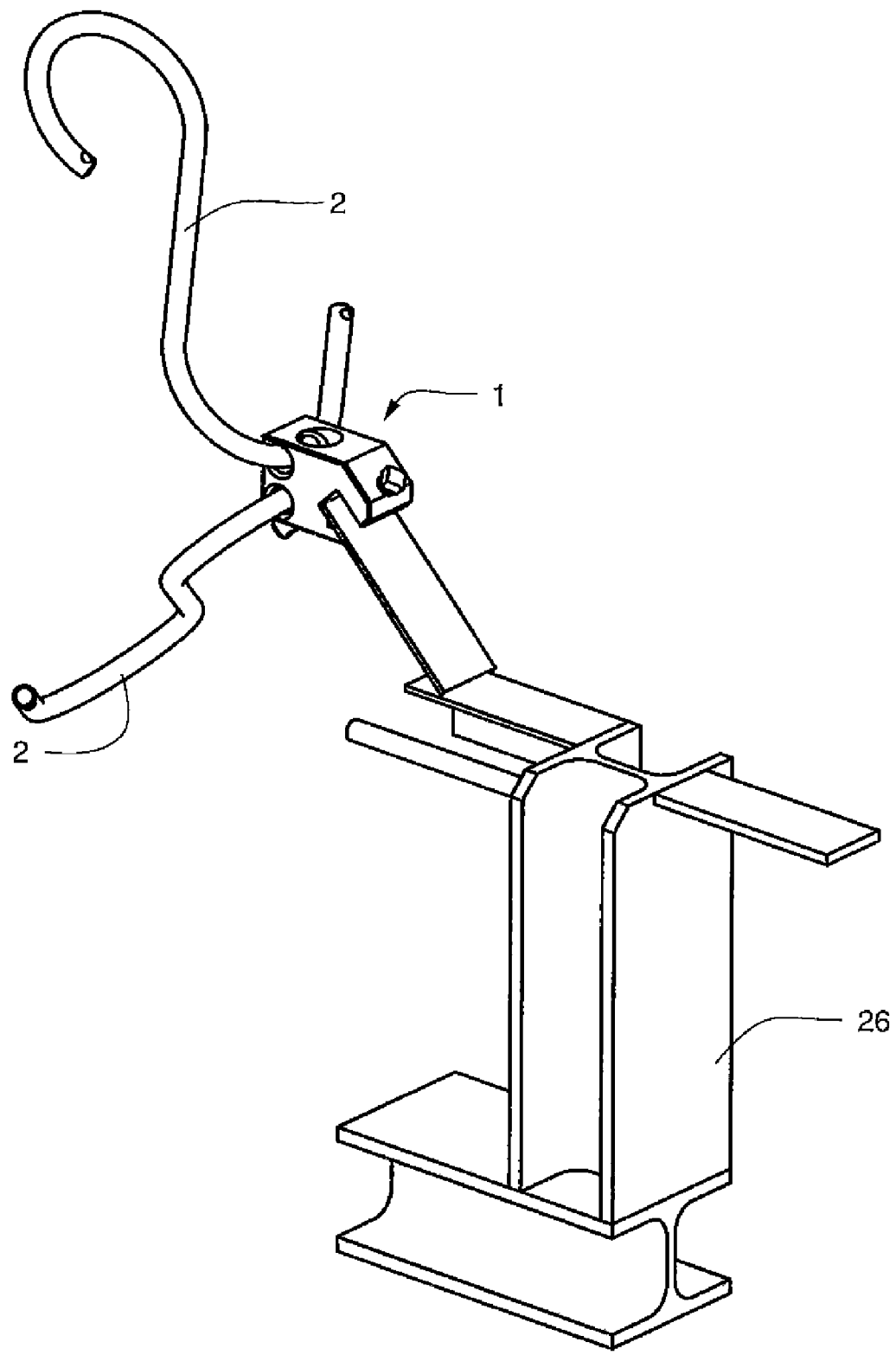
FIG. 16 is a perspective view of the hanging block in the same position as shown in FIGS. 14 and 15 but with two S hooks inserted into the block to form a seventh configuration.

FIG. 16 is a perspective view of the hanging block in the same position as shown in FIGS. 14 and 15 but with two S hooks inserted into the block to form a seventh configuration. The purpose of this figure is to show that the hanging block 1 may be used with one or two S hooks 2, depending on the needs of the particular situation.

Figure 17:
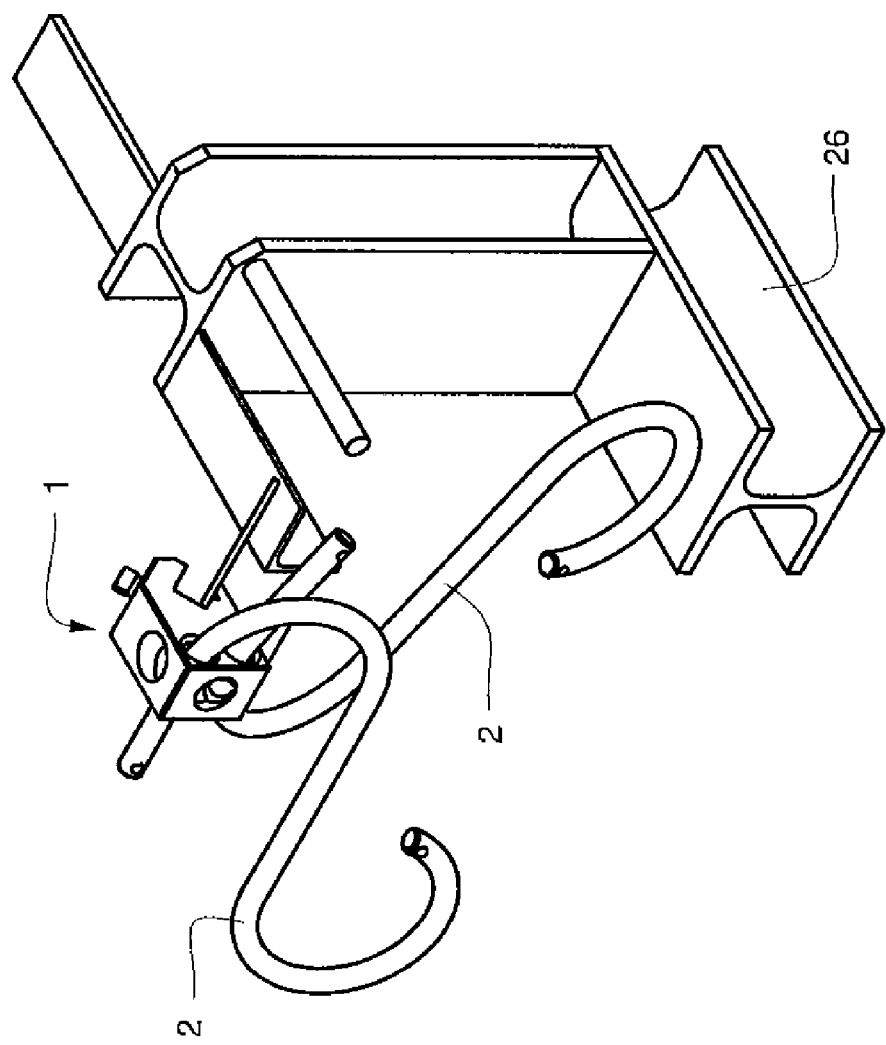
FIG. 17 is a perspective view of the hanging block in the same position as shown in FIGS. 14, 15 and 16 but with the two S hooks inserted into the block in an eighth configuration.
Figure 18:
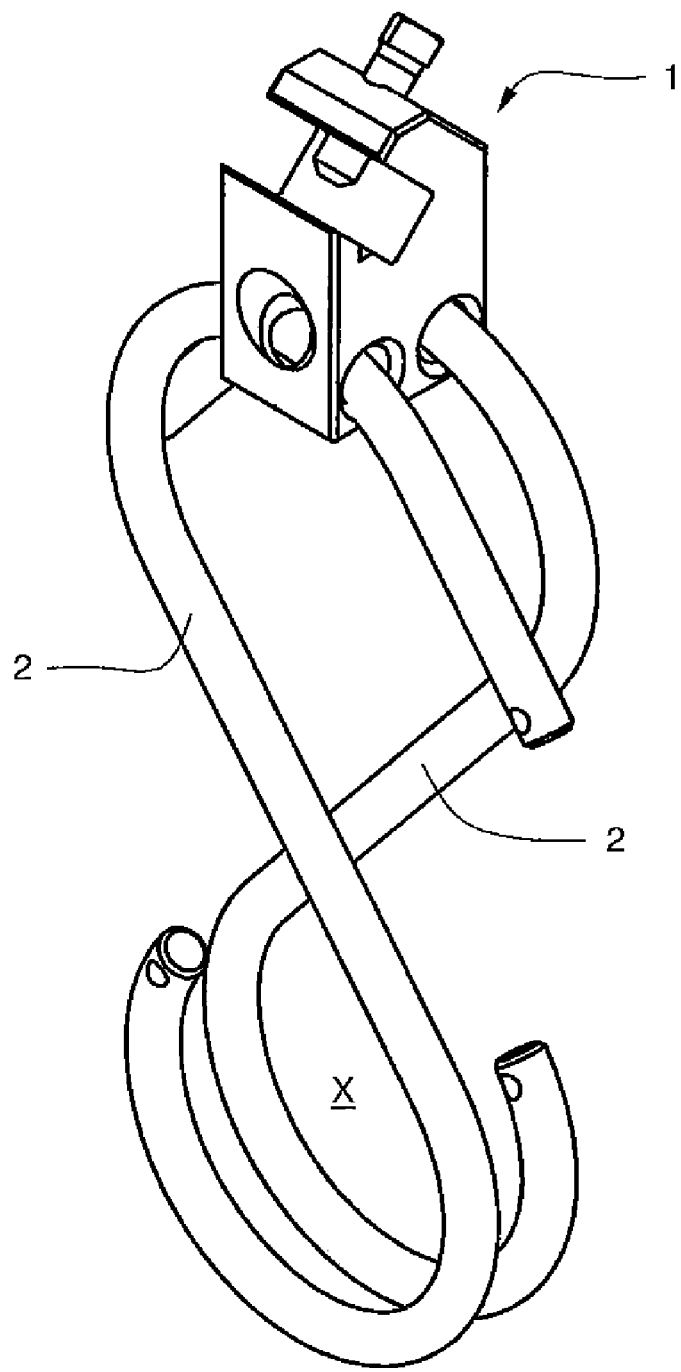
FIG. 18 is a perspective view of the hanging block with two S hooks inserted into it in the same configuration shown in FIG. 17 but without the frame.

FIG. 17 is a perspective view of the hanging block in the same position as shown in FIGS. 14, 15 and 16 but with the two S hooks inserted into the block in an eighth configuration. This figure shows the hanging block 1 and the top S hook 2 in the same position as in FIG. 16, but the position of the bottom S hook 2 has been reversed. The position of the S hooks in FIG. 17 is shown again in FIG. 18 (without the frame). This particular configuration might be used to secure cable, cord or hose in the position indicated with an "X" in FIG. 18.

Figure 19:
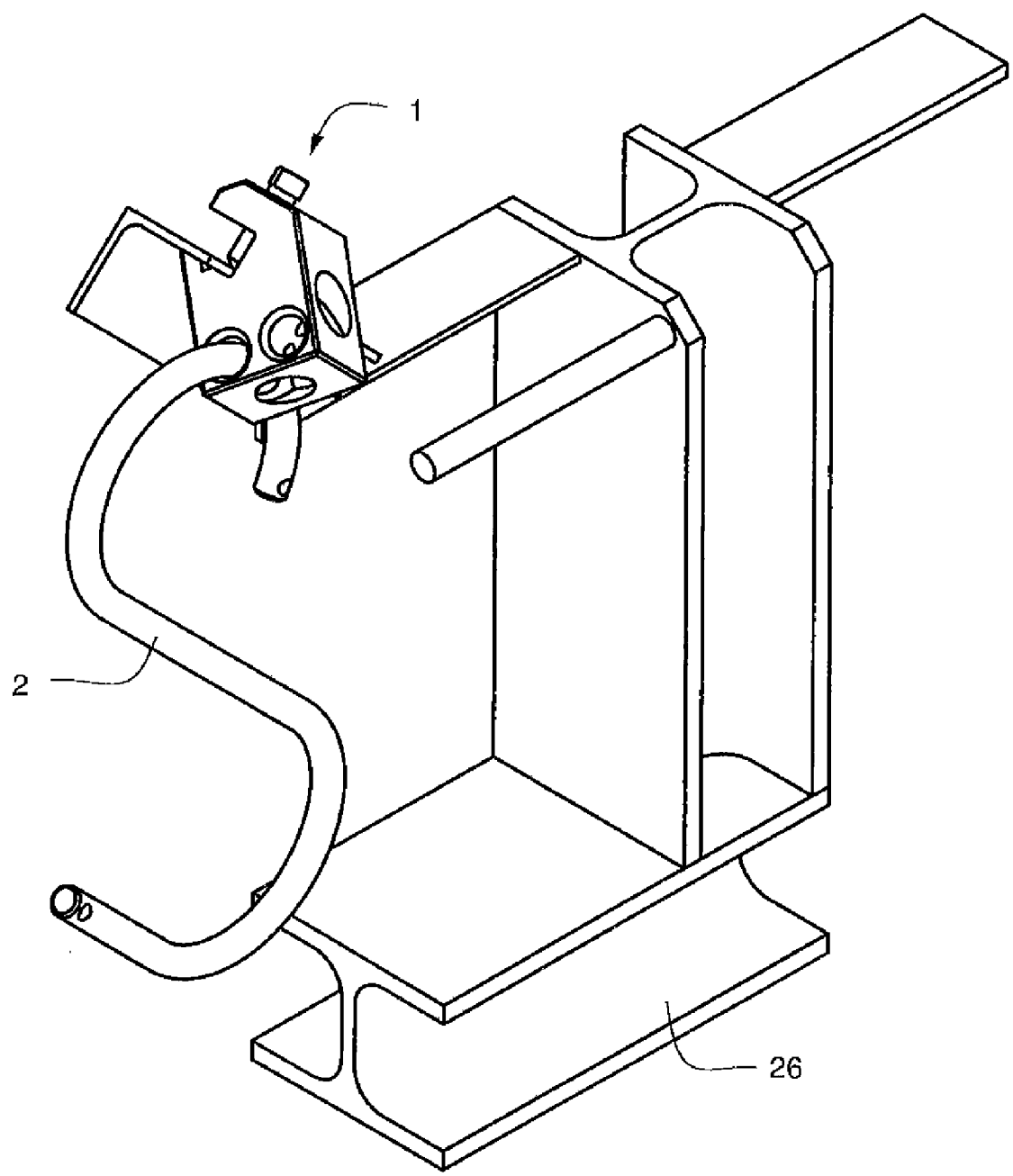
FIG. 19 is a perspective view of the hanging block on a frame with an S hook inserted into the block in a ninth configuration.

FIG. 19 is a perspective view of the hanging block on a frame with an S hook inserted into the block in a ninth configuration. In this figure, the S hook 2 is inserted into the second side S hook insertion hole 19 on one side of the hanging block 1 and out the second side S hook insertion hole 19 on the other side of the hanging block 1. Note that the S hook maintains a vertical position as in FIGS. 13 and 14.

FIG. 20 is a side view of the hanging block clamped onto a rod in a tenth configuration. The purpose of this figure is to show that the present invention can be used to clamp the hanging block 1 onto a rod as opposed to a flat surface. In this example, the hanging block 1 is clamped onto a rod 27, and the V-shaped channel 12 in the clamping port 11 serves to center the rod 27 in the floor 25 of the clamping port 11.

Figure 21:
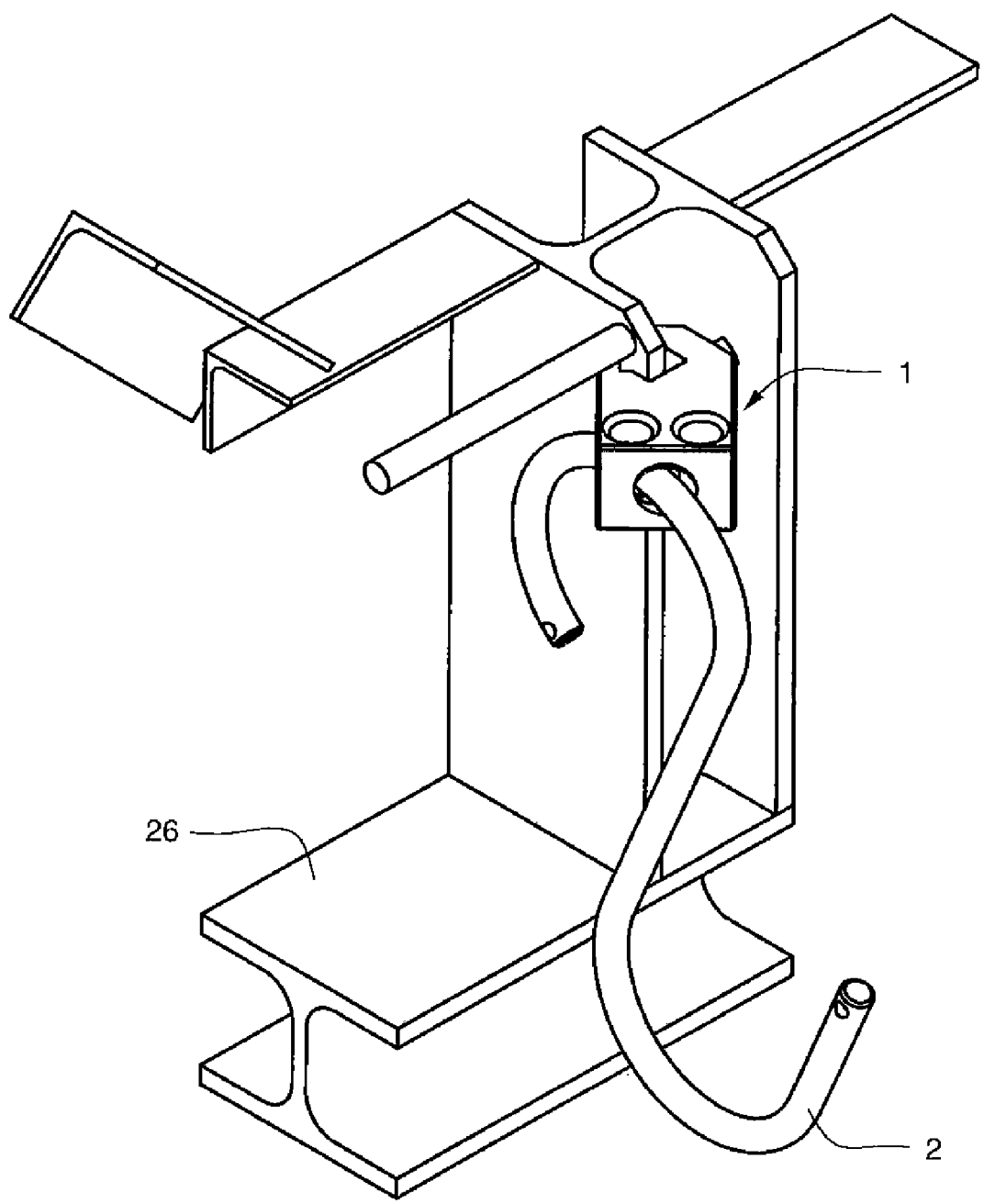
FIG. 21 is a perspective view of the hanging block on a frame with an S hook inserted into the block in an eleventh configuration.

FIG. 21 is a perspective view of the hanging block on a frame with an S hook inserted into the block in an eleventh configuration. In this figure, the S hook 2 is inserted through the bottom S hook insertion hole 21 and out the rear S hook insertion hole 20. As in FIGS. 13, 14 and 19, the S hook is maintained a vertical position regardless of the position of the hanging block 1.

Figure 22:
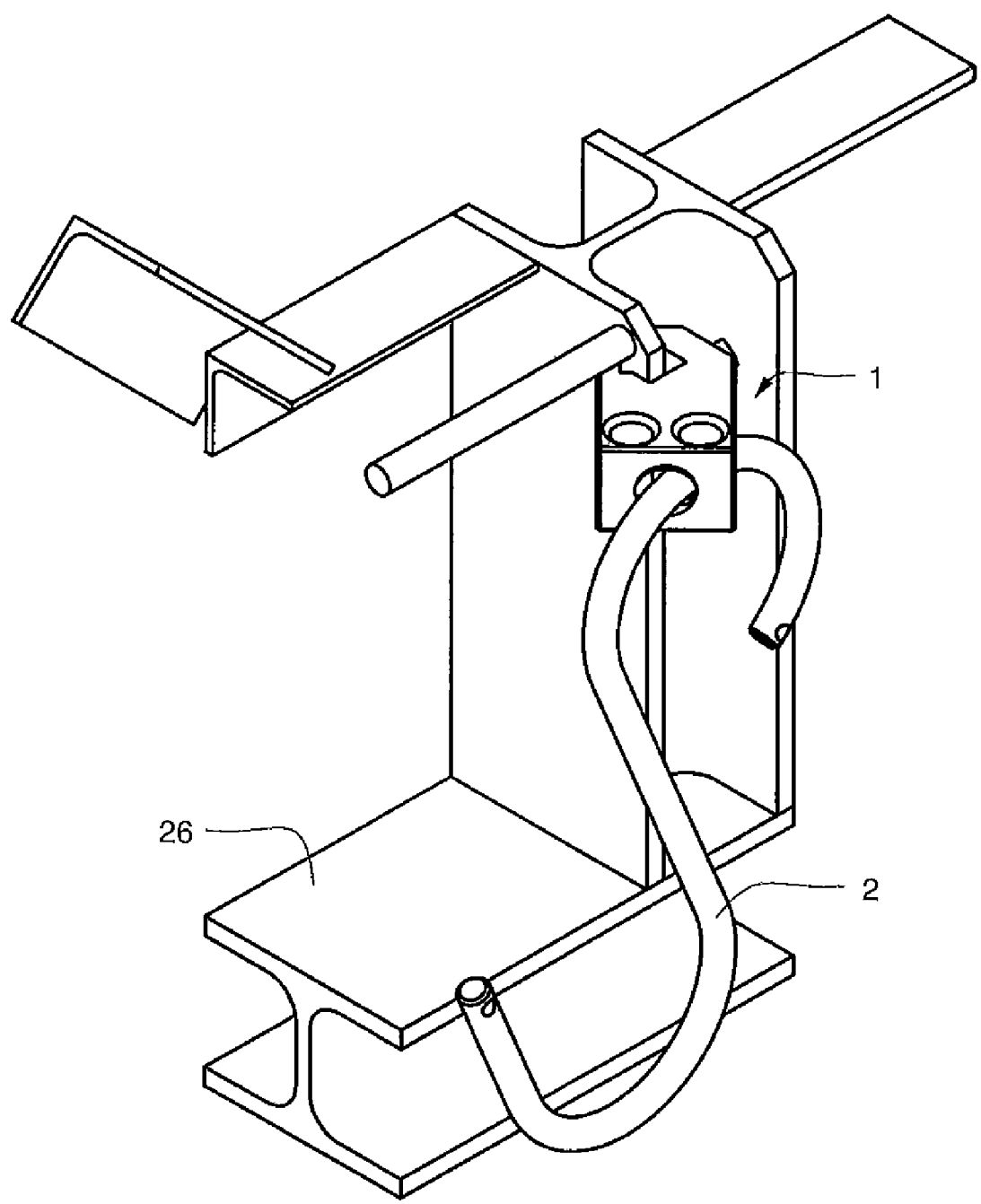
FIG. 22 is a perspective view of the hanging block on a frame in the same position as shown in FIG. 20 but with the S hook inserted into the block in a twelfth configuration.

FIG. 22 is a perspective view of the hanging block on a frame in the same position as shown in FIG. 20 but with the S hook inserted into the block in a twelfth configuration. In this figure, the S hook 2 is inserted through the bottom S hook insertion hole 21 and out the front S hook insertion hole 17. As in FIGS. 13, 14, 19 and 21, the S hook is maintained in a vertical position.

Figure 23:
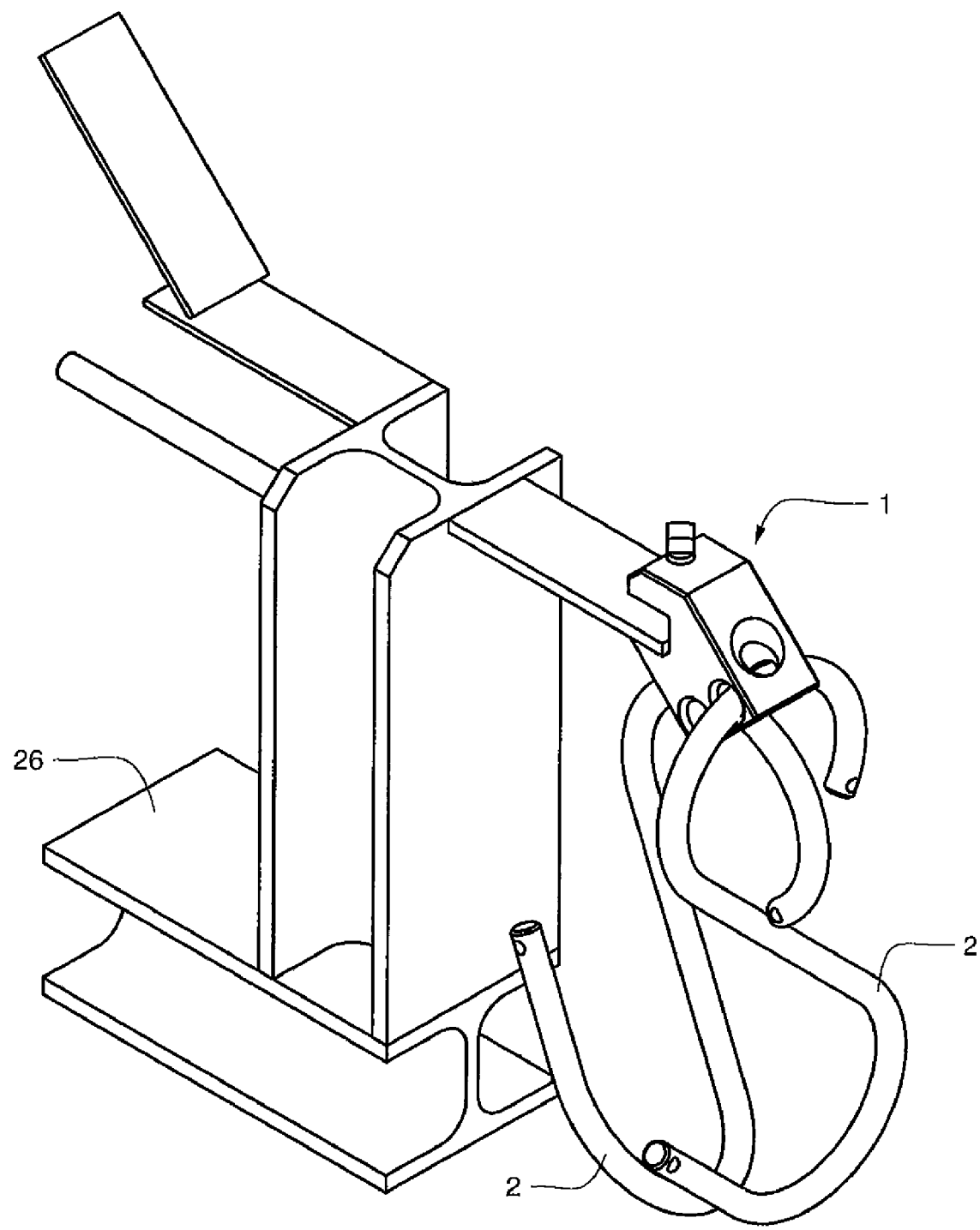
FIG. 23 is a perspective view of the hanging block on a frame with two S hooks inserted into it in a thirteenth configuration.

FIG. 23 is a perspective view of the hanging block on a frame with two S hooks inserted into it in a thirteenth configuration. In this figure, a first S hook is inserted through the rear S hook insertion hole 20 and out the bottom S hook insertion hole 21. The second S hook is inserted through the second side S hook insertion hole 19 on one side of the hanging block 1 and out the second side S hook insertion hole 19 on the other side of the hanging block 1. This configuration results in the S hooks being perpendicular to one another.

Figure 24:
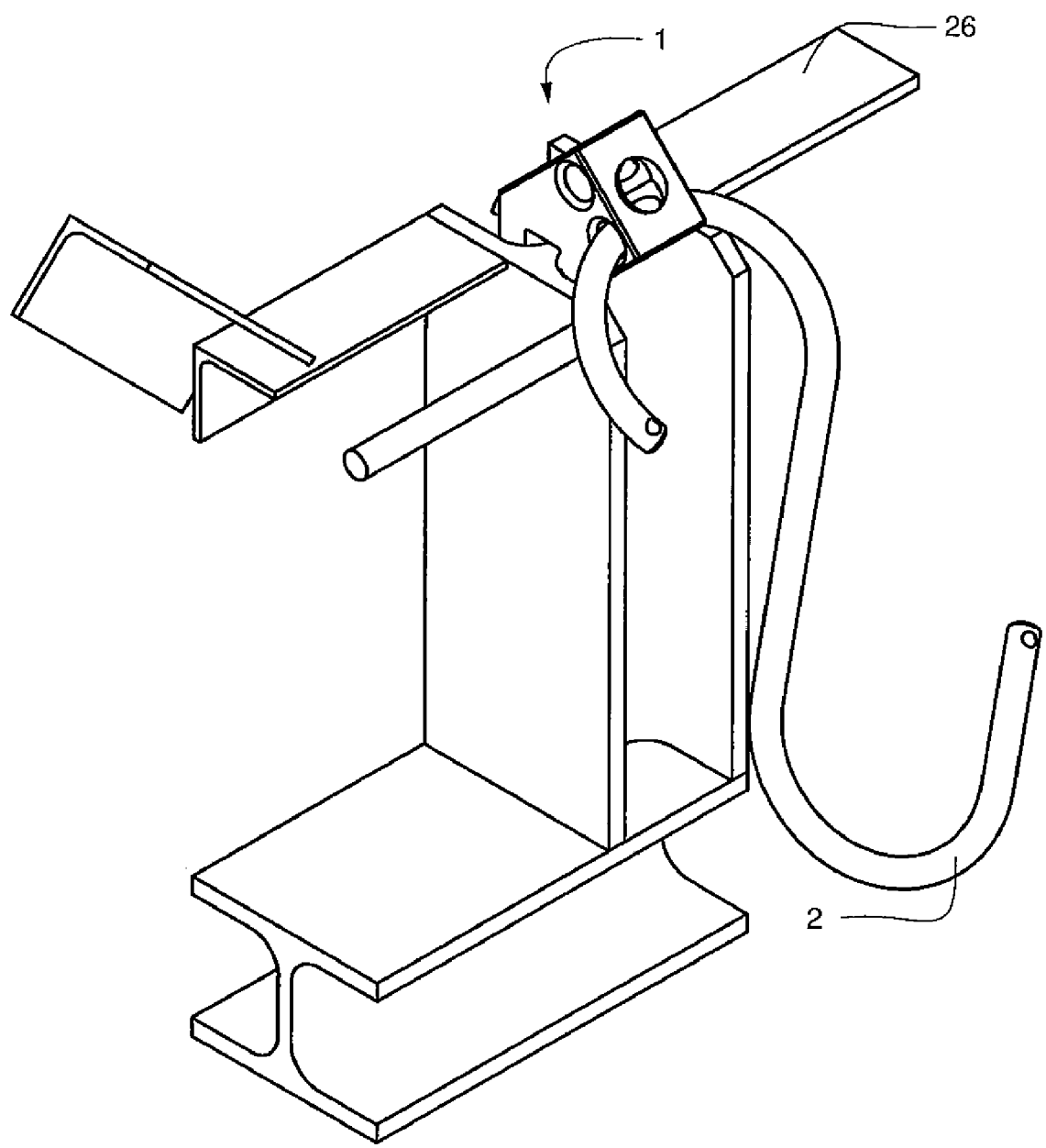
FIG. 24 is a perspective view of the hanging block on a frame with an S hook inserted into it in a fourteenth configuration.

FIG. 24 is a perspective view of the hanging block on a frame with an S hook inserted into it in a fourteenth configuration. The purpose of this figure is to illustrate that the present invention can be used in tight spaces where there is not a lot of room to attach the hanging block 1 or where the options for attaching the hanging block are limited.

Figure 25:
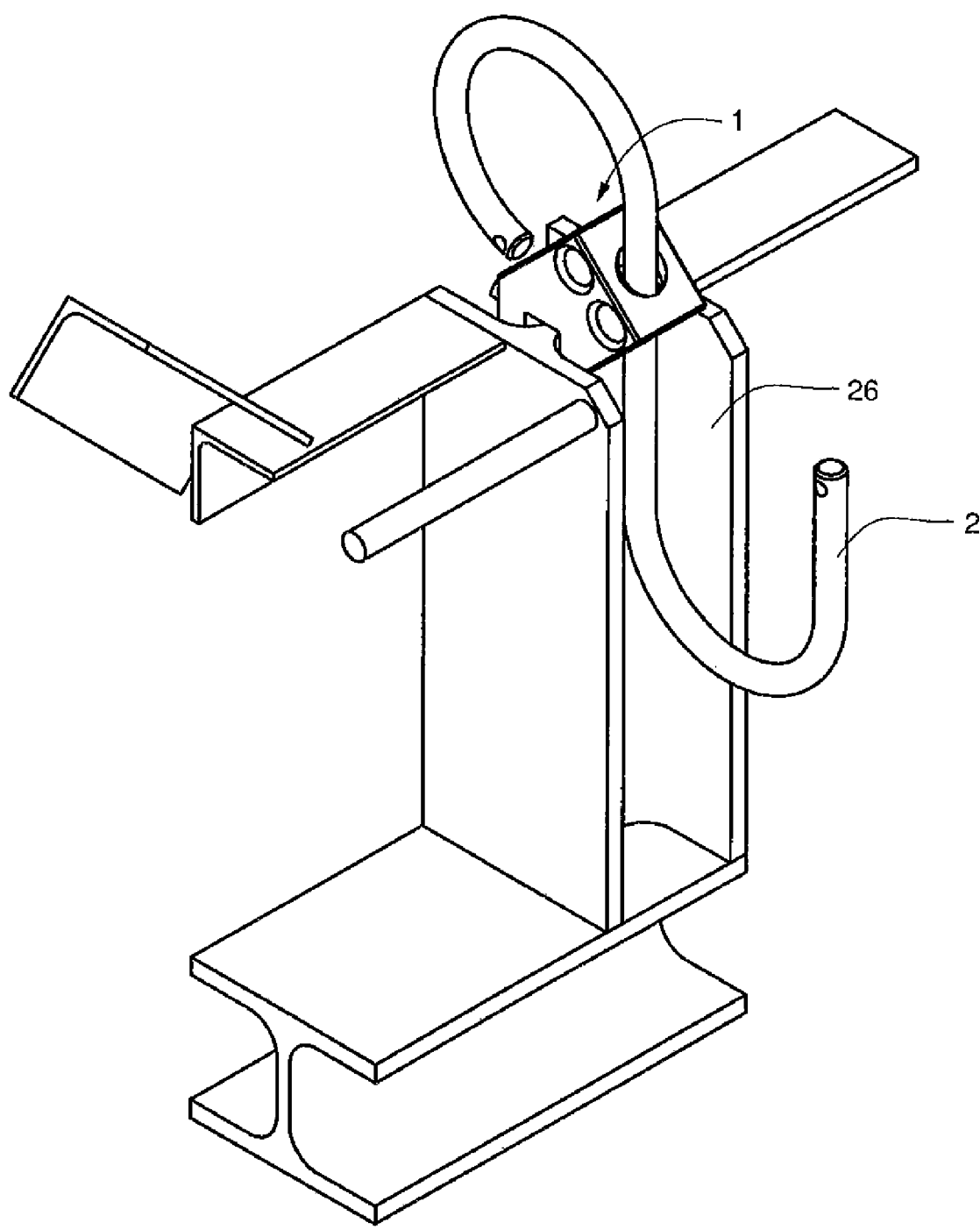
FIG. 25 is a perspective view of the hanging block on a frame in the same position as shown in FIG. 23 but with the S hook inserted into the block in a fifteenth configuration.

FIG. 25 is a perspective view of the hanging block on a frame in the same position as shown in FIG. 23 but with the S hook inserted into the block in a fifteenth configuration. The purpose of this figure is to show the versatility of the present invention in terms of allowing for different configurations in tight spaces. This particular configuration would allow the top part of the S hook 2 to be used to hold one item and the bottom part of the S hook 2 to be used to hold another item.

Figure 26:
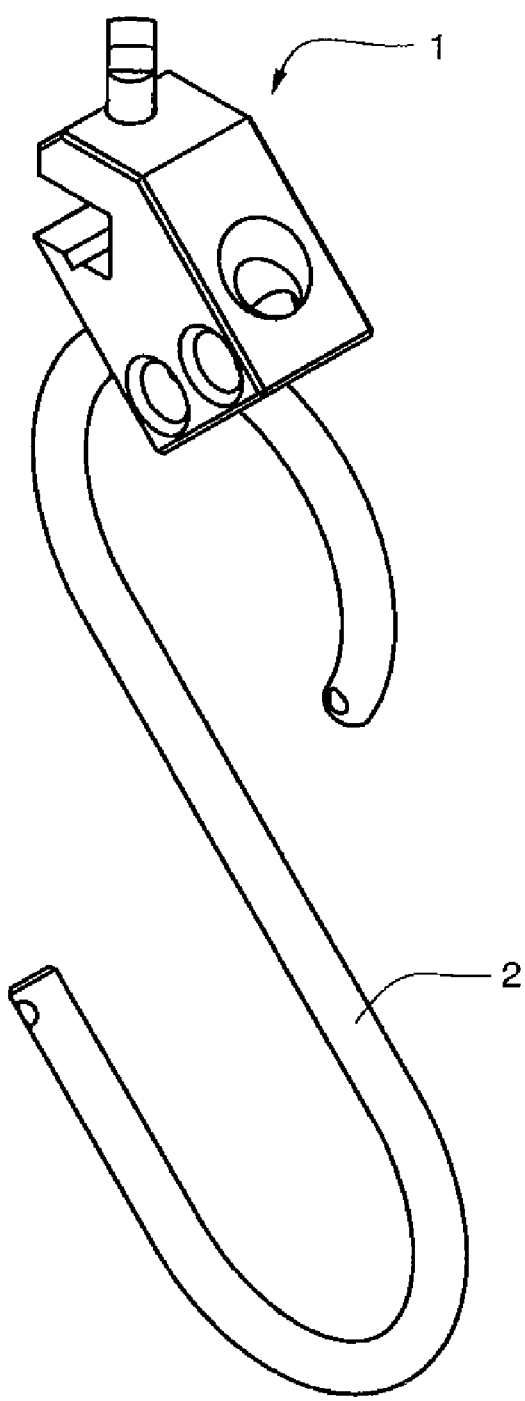
FIGS. 26 and 27 are perspective views of the hanging block with an S hook inserted into it illustrating the fact that the hanging block can be rotated ninety degrees without altering the angle of the S hook.
Figure 27:
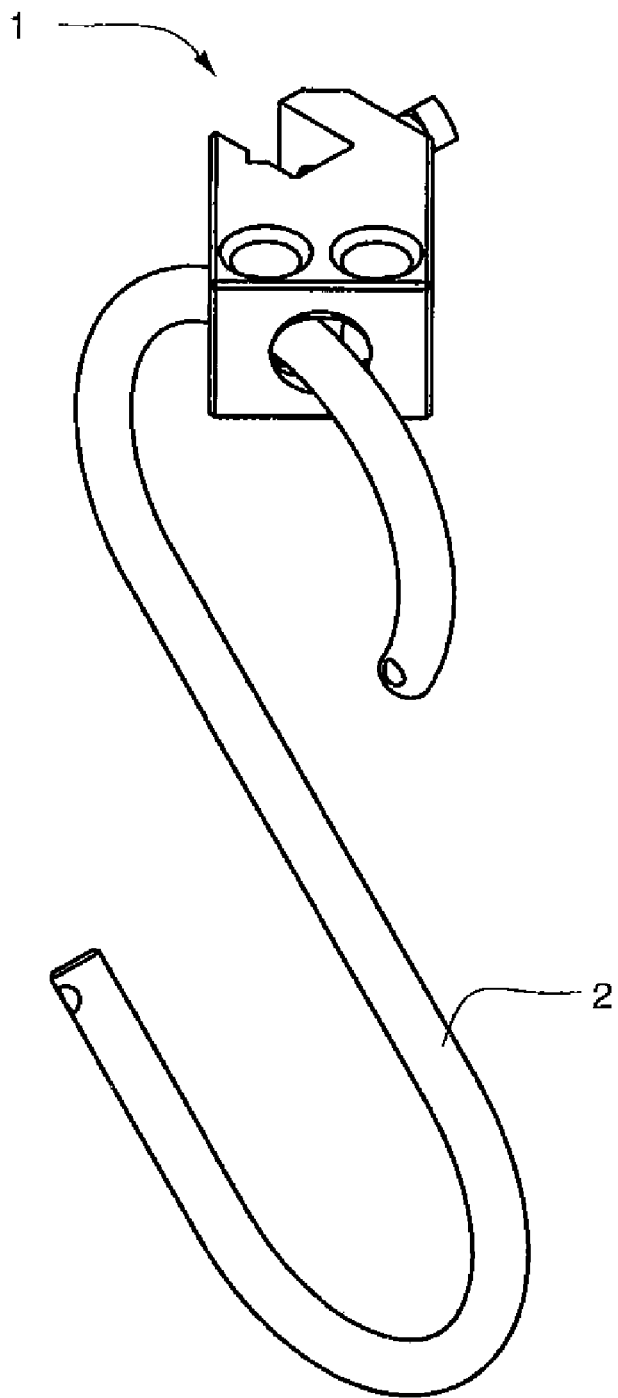

FIGS. 26 and 27 are perspective views of the hanging block with an S hook inserted into it illustrating the fact that the hanging block can be rotated ninety degrees without altering the angle of the S hook relative to the ground. In FIG. 26, the hanging block 1 is in a first position. In FIG. 27, the hanging block 1 is in a second position, but the position of the S hook 2 is unchanged.

Figure 28:
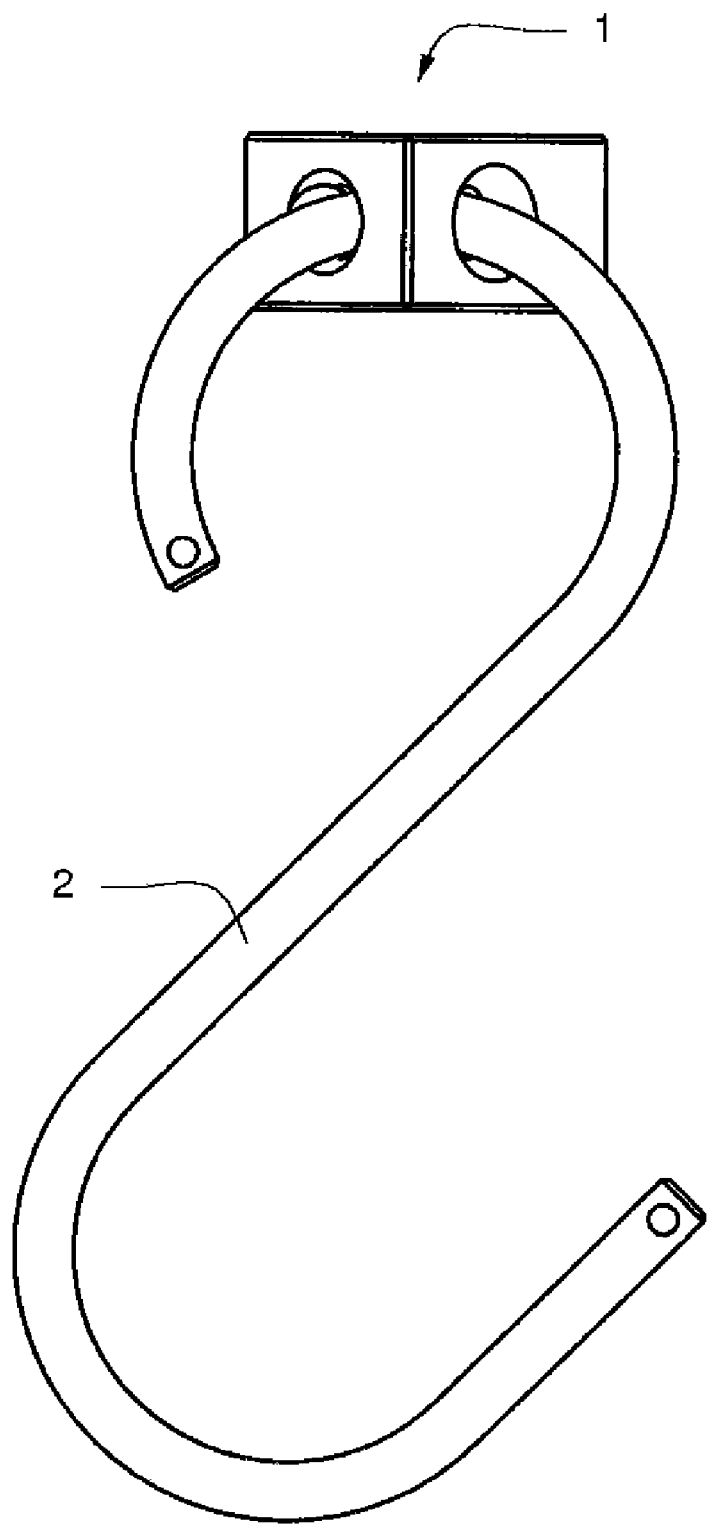
FIGS. 28 and 29 are perspective and side views, respectively, of the hanging block with an S hook inserted into it illustrating the equal loading capability of the present invention.
Figure 29:
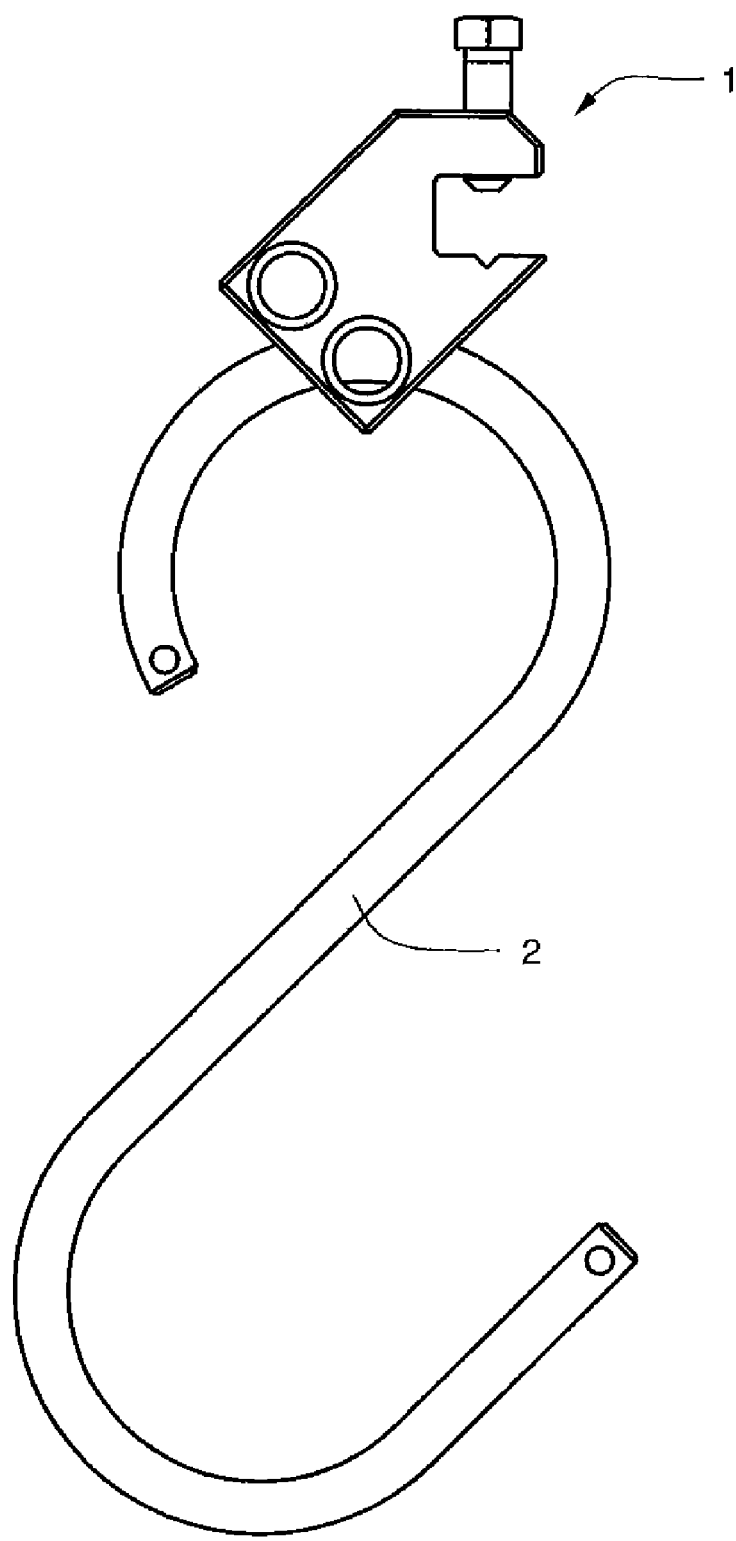

FIGS. 28 and 29 are perspective and side views, respectively, of the hanging block with an S hook inserted into it illustrating the equal loading capability of the present invention. In FIG. 28, the S hook 2 is inserted into the rear S hook insertion hole 20 and out the bottom S hook insertion hole 21. In this configuration, the S hook 2 is perpendicular to the hanging block 1, and the load or stress on either side of the hanging block 1 (i.e., at the rear S hook insertion hole 20 and the bottom S hook insertion hole 21) is evenly balanced. Similarly, in FIG. 29, the S hook 2 is inserted into the rear S hook insertion hole 20 and out the bottom S hook insertion hole 21, and the load or stress on either side of the hanging block 1 (i.e., at the rear S hook insertion hole 20 and the bottom S hook insertion hole 21) is evenly balanced. In this figure, however, the S hook 2 is parallel to the hanging block 1 because the hanging block 1 has been rotated by ninety (90) degrees. (This is the same rotation shown in FIGS. 26 and 27.)

As the above figures and discussion illustrate, the fact that the clamping port 11 is at a forty-five-degree (45°) angle relative to the front and rear surfaces 6, 8 of the hanging block, coupled with the fact that the front and rear S hook insertion holes 17, 20 are also at a forty-five-degree (45°) relative to the front and rear surfaces 6, 8 of the hanging block, ensures that the S hooks will either be perpendicular or parallel to the surface to which the hanging block 1 is attached when the S hooks are left to hang in their natural position (i.e., without being pulled in another direction). See, for example, FIGS. 13, 14, 19, and 21-25.

The above figures show the versatility of the present invention not only in terms of configurations but also in terms of where and how the hanging block can be attached. The above illustrations are intended to show only some of the possible configurations that can be utilized in connection with the present invention, and they are not intended to be limiting. The present invention expressly covers all possible configurations of one or both S hooks in combination with the hanging block and all possible hanging angles that can be achieved by any such combination.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. An all-purpose hanger comprising:
   (a) a hanging block; and
   (b) two S hooks;
   wherein the hanging block comprises a front surface, two side surfaces, a rear surface, a top surface, a bottom surface, and a clamping port;
   wherein the clamping port is at a forty-five-degree angle relative to the front and rear surfaces of the hanging block;
   wherein the hanging block further comprises a threaded bolt that extends through the top surface of the hanging block and down into the clamping port;
   wherein the hanging block further comprises a plurality of S hook insertion holes;
   wherein one S hook insertion hole is located on the front surface of the hanging block and is at a forty-five-degree angle relative to the front surface;
   wherein one S hook insertion hole is located on the rear surface of the hanging block and is at a forty-five-degree angle relative to the rear surface;
   wherein two S hook insertion holes are located on each of the side surfaces of the hanging block; and
   wherein the S hook insertion holes located on the front and rear surfaces of the hanging block exit from the bottom surface of the hanging block.

2. The all-purpose hanger of claim 1, wherein the two S hook insertion holes on either side surface of the hanging block are situated side-by-side with one of the S hook insertion holes closer to the front surface of the hanging block and the other S hook insertion hole closer to the rear surface of the hanging block.

3. The all-purpose hanger of claim 1, wherein the top surface of the hanging block comprises a first face, a second face, and a third face;
   wherein the first face is at a forty-five-degree angle relative to the front surface;
   wherein the second face is parallel to the bottom surface of the hanging block; and
   wherein the third face is at a forty-five-degree angle relative to the rear surface of the hanging block.

4. The all-purpose hanger of claim 1, wherein the threaded bolt has an angle, and wherein the angle of the S hook insertion hole on the front surface of the hanging block is parallel to the angle of the threaded bolt and the angle of the third face of the top surface.

5. The all-purpose hanger of claim 4, wherein the clamping port comprises a wall, wherein the wall has an angle, and wherein the angle of the wall is parallel to the angle of the threaded bolt.

6. The all-purpose hanger of claim 1, wherein the clamping port has an angle, and wherein the S hook insertion hole on the rear surface of the hanging block is parallel to the angle of the clamping port and of the first face of the top surface of the hanging block.

7. The all-purpose hanger of claim 1, wherein the threaded bolt and clamping port each has an angle, and wherein the angle of the threaded bolt is perpendicular to the angle of the clamping port.

8. The all-purpose hanger of claim 1, wherein the clamping port comprises a ceiling and a floor, and wherein the floor of the clamping port comprises a V-shaped channel that runs from one side surface of the hanging block to the other side surface of the hanging block.

9. The all-purpose hanger of claim 1, wherein each S hook comprises a straight end and a curved end.

10. The all-purpose hanger of claim 1, wherein each S hook comprises a first end and a second end, and wherein each S hook comprises a tie hole located on either the first or second end of the S hook.

11. The all-purpose hanger of claim 1, wherein each S hook comprises a first end and a second end, and wherein each end of the S hook comprises a tie hole.

12. The all-purpose hanger of claim 1, wherein each S hook insertion hole comprises a chamfer to allow for easier insertion of the S hooks and to facilitate movement of the S hooks in the S hook insertion holes.

13. The all-purpose hanger of claim 1, wherein when an S hook is inserted into the S hook insertion holes of the hanging block, the S hook maintains a vertical position relative to the ground regardless of the position of the hanging block.

14. The all-purpose hanger of claim 1, wherein when an S hook is inserted into the S hook insertion holes of the hanging block and the hanging block is rotated by ninety degrees, the angle of the S hook relative to the ground does not change.

* * * * *